(12) United States Patent
Kasatani

(10) Patent No.: US 9,723,337 B2
(45) Date of Patent: Aug. 1, 2017

(54) DISTRIBUTION CONTROL SYSTEM AND DISTRIBUTION SYSTEM

(71) Applicant: Kiyoshi Kasatani, Kanagawa (JP)

(72) Inventor: Kiyoshi Kasatani, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/772,218

(22) PCT Filed: Mar. 12, 2014

(86) PCT No.: PCT/JP2014/057429
§ 371 (c)(1),
(2) Date: Sep. 2, 2015

(87) PCT Pub. No.: WO2014/142343
PCT Pub. Date: Sep. 18, 2014

(65) Prior Publication Data
US 2016/0037193 A1    Feb. 4, 2016

(30) Foreign Application Priority Data

Mar. 15, 2013  (JP) .................................. 2013-054380
Mar. 15, 2013  (JP) .................................. 2013-054437
(Continued)

(51) Int. Cl.
*H04N 21/2343*   (2011.01)
*H04N 21/258*    (2011.01)
(Continued)

(52) U.S. Cl.
CPC .............. *H04N 21/234336* (2013.01); *H04N 21/234309* (2013.01); *H04N 21/25825* (2013.01);
(Continued)

(58) Field of Classification Search
CPC ....... H04N 21/8153; H04N 21/234336; H04N 21/440263; H04N 21/4728; H04N 21/2343; H04N 21/25825; H04N 21/234309
See application file for complete search history.

(56) References Cited

U.S. PATENT DOCUMENTS 8,074,248 B2  12/2011 Sigmon, Jr. et al.
8,078,694 B2  12/2011 Barton et al.
(Continued)

FOREIGN PATENT DOCUMENTS

EP  1 970 835 A1   9/2008
JP  2004-193702    7/2004
(Continued)

OTHER PUBLICATIONS

Extended European Search Report issued Feb. 8, 2016 in Patent Application No. 14763579.1.
(Continued)

*Primary Examiner* — Benjamin R Bruckart
*Assistant Examiner* — Jason Thomas
(74) *Attorney, Agent, or Firm* — Oblon, McClelland, Maier & Neustadt, L.L.P.

(57) ABSTRACT

A distribution control system includes a generating unit configured to generate still image data from content data; a converting unit configured to convert the still image data into video data; and a transmitting unit configured to transmit the video data to a communication terminal.

12 Claims, 22 Drawing Sheets

(30) Foreign Application Priority Data

Oct. 1, 2013 (JP) .................................. 2013-206417
Jan. 14, 2014 (JP) .................................. 2014-004175
Feb. 18, 2014 (JP) .................................. 2014-028995

(51) Int. Cl.
    *H04N 21/4402*    (2011.01)
    *H04N 21/61*       (2011.01)
    *H04N 21/81*       (2011.01)
    *H04N 21/4728*    (2011.01)
    *H04N 21/2662*    (2011.01)

(52) U.S. Cl.
CPC .. *H04N 21/2662* (2013.01); *H04N 21/440263* (2013.01); *H04N 21/4728* (2013.01); *H04N 21/6125* (2013.01); *H04N 21/8153* (2013.01); *H04N 21/8173* (2013.01)

(56) References Cited

U.S. PATENT DOCUMENTS

| | | | |
|---|---|---|---|
| 8,127,233 | B2 | 2/2012 | McDowell |
| 8,254,704 | B2 | 8/2012 | Lu et al. |
| 2002/0015042 | A1 | 2/2002 | Robotham et al. |
| 2004/0239681 | A1 | 12/2004 | Robotham et al. |
| 2007/0189708 | A1* | 8/2007 | Lerman .................. G11B 27/34 386/280 |
| 2007/0263007 | A1 | 11/2007 | Robotham et al. |
| 2008/0229427 | A1 | 9/2008 | Ramirez |
| 2009/0119736 | A1 | 5/2009 | Perlman et al. |
| 2010/0083146 | A1 | 4/2010 | Hasuike et al. |
| 2010/0134587 | A1 | 6/2010 | Grasso et al. |
| 2010/0149306 | A1* | 6/2010 | Gopal ..................... H04N 7/152 348/14.09 |
| 2010/0194753 | A1 | 8/2010 | Robotham et al. |
| 2011/0179104 | A1* | 7/2011 | Hakoda ................ G11B 27/034 709/203 |
| 2011/0289108 | A1* | 11/2011 | Bhandari .......... G06F 17/30905 707/769 |
| 2012/0185783 | A1 | 7/2012 | Avellan et al. |
| 2012/0185785 | A1 | 7/2012 | Avellan et al. |
| 2014/0280446 | A1 | 9/2014 | Kasatani |
| 2014/0280458 | A1 | 9/2014 | Kasatani |
| 2014/0280722 | A1 | 9/2014 | Kasatani |
| 2014/0280725 | A1 | 9/2014 | Kasatani |
| 2014/0280777 | A1 | 9/2014 | Kasatani |
| 2014/0282039 | A1 | 9/2014 | Kasatani |
| 2014/0282778 | A1 | 9/2014 | Kasatani |
| 2014/0282793 | A1 | 9/2014 | Kasatani |
| 2014/0282794 | A1 | 9/2014 | Kasatani |
| 2015/0156246 | A1 | 6/2015 | Avellan et al. |

FOREIGN PATENT DOCUMENTS

| | | |
|---|---|---|
| JP | 2007-221229 | 8/2007 |
| JP | 2008-225516 | 9/2008 |
| JP | 2008-269059 | 11/2008 |
| JP | 2011-061385 | 3/2011 |
| JP | 2011-508477 | 3/2011 |
| JP | 2012-080593 | 4/2012 |
| WO | 2008/120517 | 10/2008 |

OTHER PUBLICATIONS

International Search Report and Written Opinion issued on Jun. 17, 2014 for PCT/JP2014/057429 filed on Mar. 12, 2014.
U.S. Appl. No. 14/772,150, filed Sep. 2, 2015.
U.S. Appl. No. 14/773,138, filed Sep. 4, 2015.
U.S. Appl. No. 14/774,433, filed Sep. 10, 2015.

\* cited by examiner

FIG.12

DISTRIBUTION DESTINATION
SELECTION MENU

CHECK ANY CONTENT DISTRIBUTION DESTINATION
AND PRESS "OK"

| CHECK | SHARED ID | DISPLAY NAME |
|---|---|---|
|  | v003 | TOKYO HEAD OFFICE 10F MFP |
| ✓ | v006 | OSAKA EXHIBITION HALL 1F MULTIDISPLAY |
| ⋮ | ⋮ | ⋮ |

OK  CANCEL

FIG.13

| TERMINAL ID | USER CERTIFICATE | CONTRACT INFORMATION | TERMINAL TYPE | SETTING INFORMATION (HOME URL) | EXECUTION ENVIRONMENT INFORMATION (FAVORITES) (PREVIOUS COOKIE INFORMATION) (CACHE FILE) | SHARED ID | INSTALLATION POSITION | DISPLAY NAME |
|---|---|---|---|---|---|---|---|---|
| t001 | ...... | FHD, 30FPS, 3-MONTH CONTRACT | NOTEBOOK PC | http://www.rocoh.co.jp | ...... | v001 | - | BEIJING OFFICE 10F TERMINAL |
| t002 | ...... | HD, 30FPS, 3-MONTH CONTRACT | TABLET TERMINAL | http://www.rocoh.co.jp | ...... | v002 | - | NEW YORK OFFICE 1F LOBBY RECEPTION TERMINAL |
| t003 | ...... | QVGA, 15FPS, 6 MONTHS | MFP | http://www.rocoh.co.jp | ...... | v003 | - | TOKYO HEAD OFFICE 10F MFP |
| t004 | ...... | WXGA, 15FPS, 12 MONTHS | PROJECTOR | http://www.pontax.co.jp | ...... | v004 | - | TOKYO HEAD OFFICE 1F LOBBY PROJECTOR |
| t005 | ...... | WXGA, 15FPS, 6 MONTHS | CAMERA/MICROPHONE/SPEAKER | - | - | v005 | - | NAGOYA BRANCH OFFICE 2F TV CONFERENCE ROOM TERMINAL |
| t006 | ...... | FHD, 30FPS, 12-MONTH CONTRACT | MULTIDISPLAY | - | - | v006 | LEFT | OSAKA EXHIBITION HALL 1F MULTI-DISPLAY |
| t007 | ...... | FHD, 30FPS, 12-MONTH CONTRACT | MULTIDISPLAY | - | - | v006 | MIDDLE | OSAKA EXHIBITION HALL 1F MULTI-DISPLAY |
| t008 | ...... | FHD, 30FPS, 12-MONTH CONTRACT | MULTIDISPLAY | - | - | v006 | RIGHT | OSAKA EXHIBITION HALL 1F MULTI-DISPLAY |
| ... | ... | ... | ... | ... | ... | ... | ... | ... |

FIG.14
| TERMINAL ID | SHARED ID |
|---|---|
| t001 | v003 |
| t001 | v006 |
| t002 | v001 |
| ⋮ | ⋮ |
FIG.15
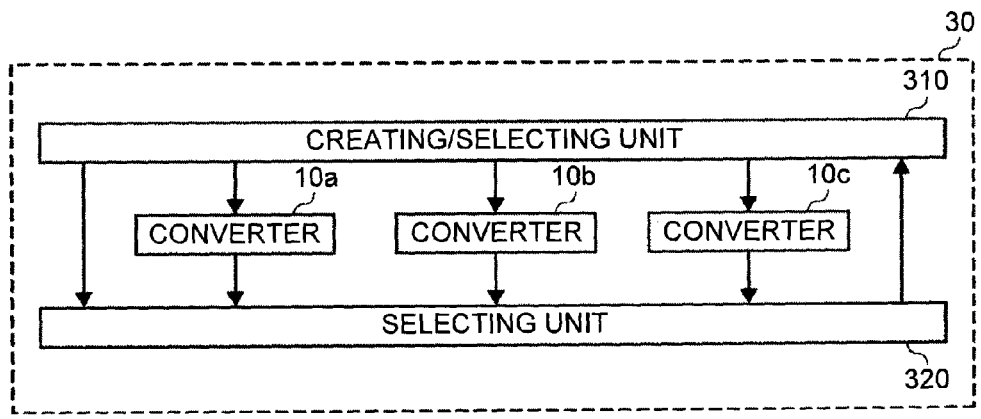
FIG.16
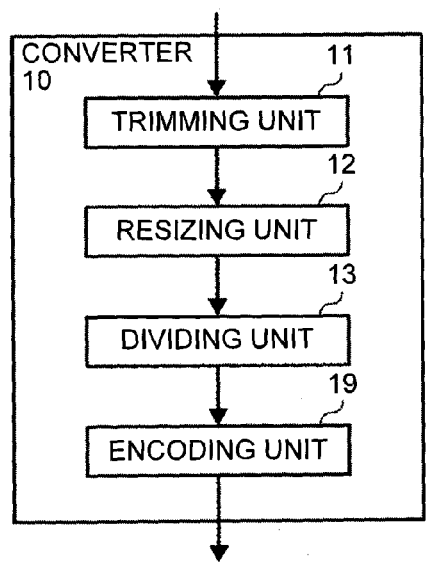

DISTRIBUTION CONTROL SYSTEM AND DISTRIBUTION SYSTEM

TECHNICAL FIELD

The present invention relates to transmission of data to communication terminals such as personal computers and electronic blackboards.

BACKGROUND ART

With the recent widespread use of the Internet, cloud computing has been used in various fields. Cloud computing is a service usage pattern in which users use services (cloud services) provided by a server on the Internet, using a communication terminal connected to the Internet and pay for the service.

Web content carried on the Internet tends to be enriched for the purpose of responding to various demands. As a result, accessing the enriched content using a communication terminal for making use of services through the Internet involves a problem in that a load on the communication terminal is unfavorably high.

As a technology for reducing loads on communication terminals, there is a technology called thin client (refer to Japanese Patent Application Laid-open No. 2007-221229, for example). This thin client technology allows various applications to be executed on communication terminals in a web-based manner using an Internet, environment.

Even with the thin client technology, there still remains a problem in that a high load is imposed on a communication terminal to access enriched content.

DISCLOSURE OF INVENTION

It is an object of the present invention to at least partially solve the problems in the conventional technology.

According to an embodiment, there is provided a distribution, control system that includes a generating unit configured to generate still image data from content data; a converting unit configured to convert the still image data into video data; and a transmitting unit configured to transmit the video data to a communication terminal.

The above and other objects, features, advantages and technical and industrial significance of this invention will be better understood by reading the following detailed description of presently preferred embodiments of the invention, when considered in connection with the accompanying drawings.

BRIEF DESCRIPTION OF DRAWINGS

FIG. 12 is a conceptual view of a distribution destination selection menu screen.

FIG. 13 is a conceptual view of a terminal management table.

FIG. 14 is a conceptual view of an available terminal management table.

FIG. 15 is a detailed diagram of an encoder bridge unit.

FIG. 16 is a functional block diagram illustrating the functions of a converter.

BEST MODE FOR CARRYING OUT THE INVENTION

Described below with reference to the accompanying drawings is a distribution system 1 according to an embodiment. Described below in detail is an invention that causes both a web browser (hereinafter referred to as a "browser") and an encoder to execute in cooperation with each other in the cloud through cloud computing and transmits video data, sound data, and the like to communication terminals.

In the following, "images" include a still image and a moving image. "Videos" basically mean moving images and also include moving images that are stopped to be still images. A "still image (sound)" represents at least either one of a still image and sound. An "image (sound)" represents at least either one of an image and sound. A "video (sound)" represents at least either one of video and sound.

Outline of the Embodiment

Figure 1:
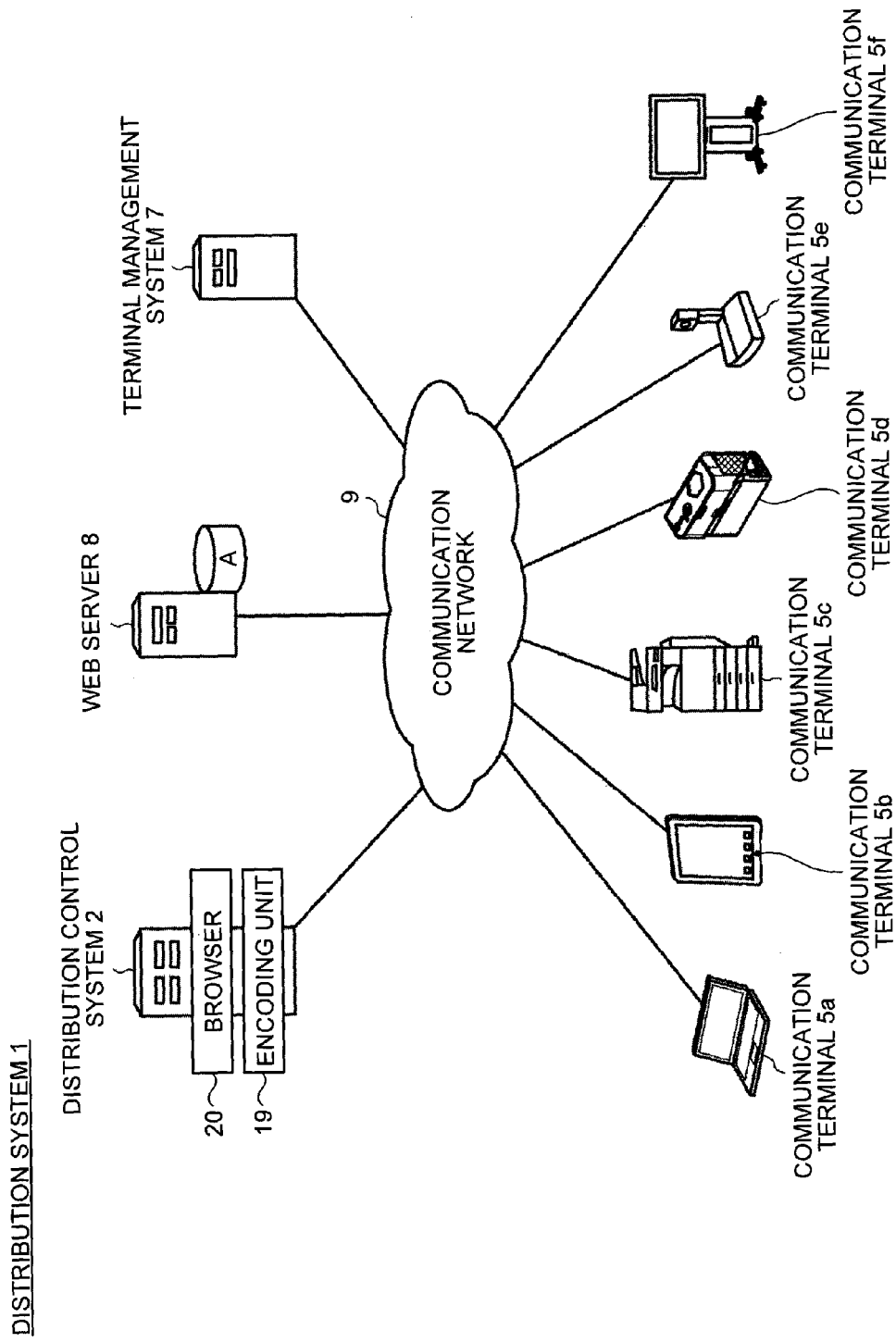
FIG. 1 is a schematic diagram of a distribution system according to an embodiment.

Described with reference to FIG. 1 is an outline of the embodiment according to the present invention. FIG. 1 is a schematic diagram of a distribution system according to the present embodiment.

Outline of System Configuration

Described first is an outline of the configuration of the distribution system 1.

As illustrated in FIG. 1, the distribution system 1 according to the present embodiment includes a distribution control system 2, a plurality of communication terminals (5a to 5f), a terminal management system 7, and a web server 8. In the following, any communication terminal among the communication terminals (5a to 5f) can be referred to as a "communication terminal 5". The distribution control system 2, the terminal management system 7, and the web server 8 are all implemented by server computers.

The communication terminal 5 is a terminal used by a user who receives services of the distribution system 1. The communication terminal 5a is a notebook personal computer (PC). The communication terminal 5b is a mobile terminal such as a smartphone or a tablet terminal. The communication terminal 5c is a multifunction peripheral/printer/product (MFP) in which the functions of copying, scanning, printing, and faxing are combined. The communication terminal 5d is a projector. The communication terminal 5e is a TV (video) conference terminal having a camera, a microphone, and a speaker. The communication terminal 5f is an electronic blackboard (whiteboard) capable of electronically converting drawings drawn by a user or the like.

The communication terminal 5 is not only such terminals as illustrated in FIG. 1, but also may be devices communicable through a communication network such as the Internet, including a watch, a vending machine, a car navigation device, a game console, an air conditioner, a lighting fixture, a camera alone, a microphone alone, and a speaker alone.

The distribution control system 2, the communication terminal 5, the terminal management system 7, and the web server 8 can communicate with each other through a communication network 9 including the Internet and a local area network (LAN). Examples of the communication network 9 may include wireless communication networks such as 3rd Generation (3G), Worldwide Interoperability for Microwave Access (WiMAX), and Long-Term Evolution (LTE).

Figure 2:
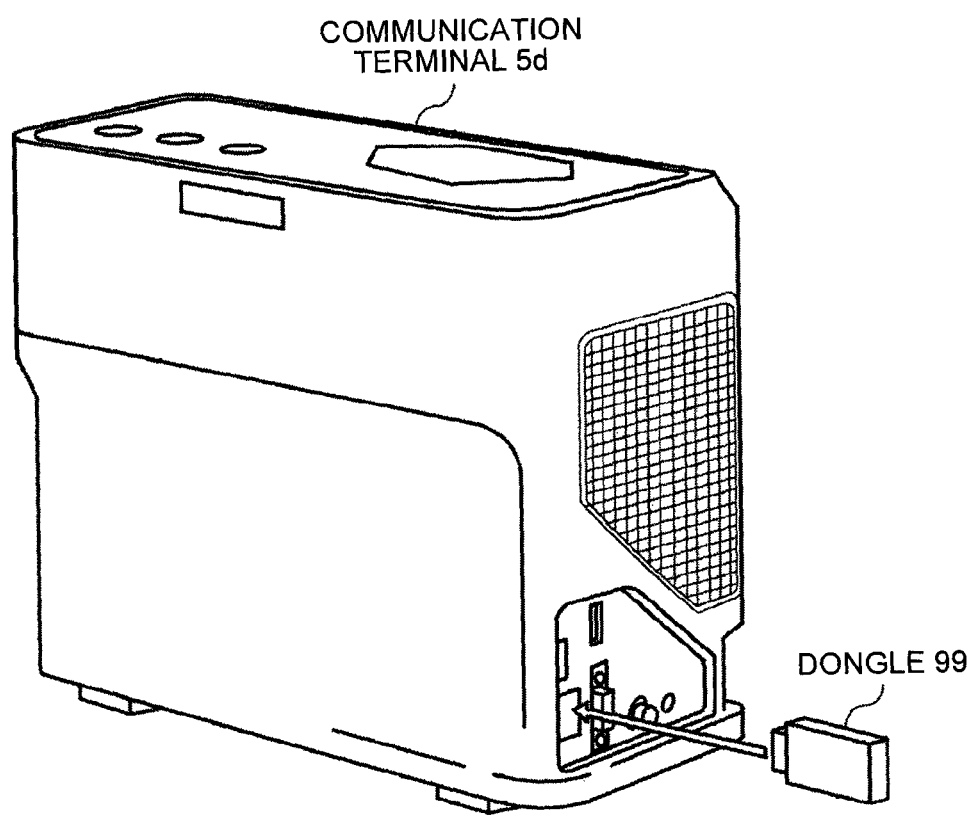
FIG. 2 is a conceptual view when a dongle is attached to a communication terminal.

The communication terminal 5d, for example, among the communication terminals 5 does not have a function of communicating with the other terminals or systems through the communication network 9. However, as illustrated in FIG. 2, a user inserts a dongle 99 into an interface such as Universal Serial Bus (USB) or High-Definition Multimedia Interface (HDMI) of the communication terminal 5d, thereby enabling it to communicate with the other terminals and systems. FIG. 2 is a conceptual view when the dongle is attached to the communication terminal.

The distribution control system 2 has a browser 20 in the cloud, and through the function of rendering in the browser 20, acquires a single or a plurality of pieces of content data described in a certain description language and performs rendering on the content data, thereby generating frame data including still image data such as bitmap data made up of red, green, and blue (RGB) and sound data such as pulse code modulation (PCM) data (i.e., still image (sound) data). The content data is data acquired from the web server 8, any communication terminal, and the like and includes image (sound) data in Hypertext Markup Language (HTML) and Cascading Style Sheets (CSS), image (sound) data in MP4 (MPEG-4), and sound data in Advanced Audio Coding (AAC).

The distribution control system 2 has an encoding unit 19 in the cloud, and the encoding unit 19 plays a role as an encoder, thereby converting frame data as still image (sound) data into video (sound) data in the compression coding format such as H.264 (MPEG-4 AVC), H.265, and Motion JPEG.

The terminal management system 7 performs login authentication on the communication terminal 5 and manages contract information and the like of the communication terminal 5. The terminal management system 7 has a function of a Simple Mail Transfer Protocol (SMTP) server for transmitting e-mail. The terminal management system 7 can be embodied as, for example, a virtual machine developed on a cloud service (IaaS: Infrastructure as a Service). It is desirable that the terminal management system 7 be operated in a multiplexed manner to provide service continuity in case of unexpected incidents.

The browser 20 enables real-time communication/collaboration (RTC). The distribution control system 2 includes the encoding unit 19 in FIG. 16 described below, and the encoding unit 19 can perform real-time encoding on frame data output by the browser 20 and output video (sound) data generated through conversion compliant with the H.264 standard or the like. As a result, the processing of the distribution control system 2 is different from, for example, processing in a case in which non real-time video (sound) data recorded in a DVD is read and distributed by a DVD player.

Not only the distribution control system 2, but also the communication terminal 5 may have a browser. In this case, updating the browser 20 of the distribution control system 2 eliminates the need to start up the browsers of the respective communication terminals 5.

Outline of Various Kinds of Distribution Methods

Described next is an outline of various distribution methods.

Basic Distribution

Figure 3:
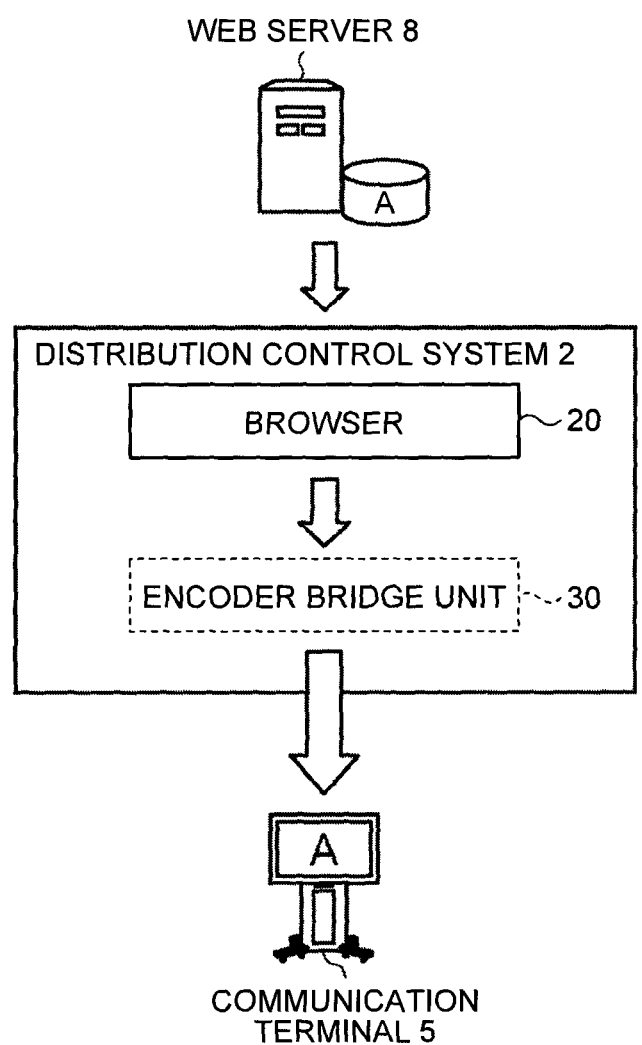
FIG. 3 is a conceptual diagram illustrating a basic distribution method.

FIG. 3 is a conceptual diagram illustrating a basic distribution method. In the distribution system 1, as illustrated in FIG. 3, the browser 20 of the distribution control system 2 acquires web content data [A] as image (sound) data from the web server 8 and renders it, thereby generating pieces of frame data [A] as still image (sound) data. An encoder bridge unit 30 including the encoding unit 19 performs encoding and the like on the pieces of frame data [A], thereby converting them into video (sound) data [A] in the compression coding format such as H.264 (an example of transmission data). The distribution control system 2 distributes the video (sound) data [A] converted to the communication terminal 5.

Thus, the distribution control system 2 can distribute even rich web content data to the communication terminal 5 while converting it from the web content data in HTML or the like into the compressed video (sound) data in H.264 or the like in the cloud. As a result, the communication terminal 5 can reproduce the web content smoothly without time and costs for adding the latest browser or incorporating a higher-spec central processing unit (CPU), operating system (OS), random access memory (RAM), and the like.

Future enrichment in web content will only require higher specifications of the browser 20, the CPU, and the like in the distribution control system 2 in the cloud, without the need for higher specifications of the communication terminal 5.

Figure 4:
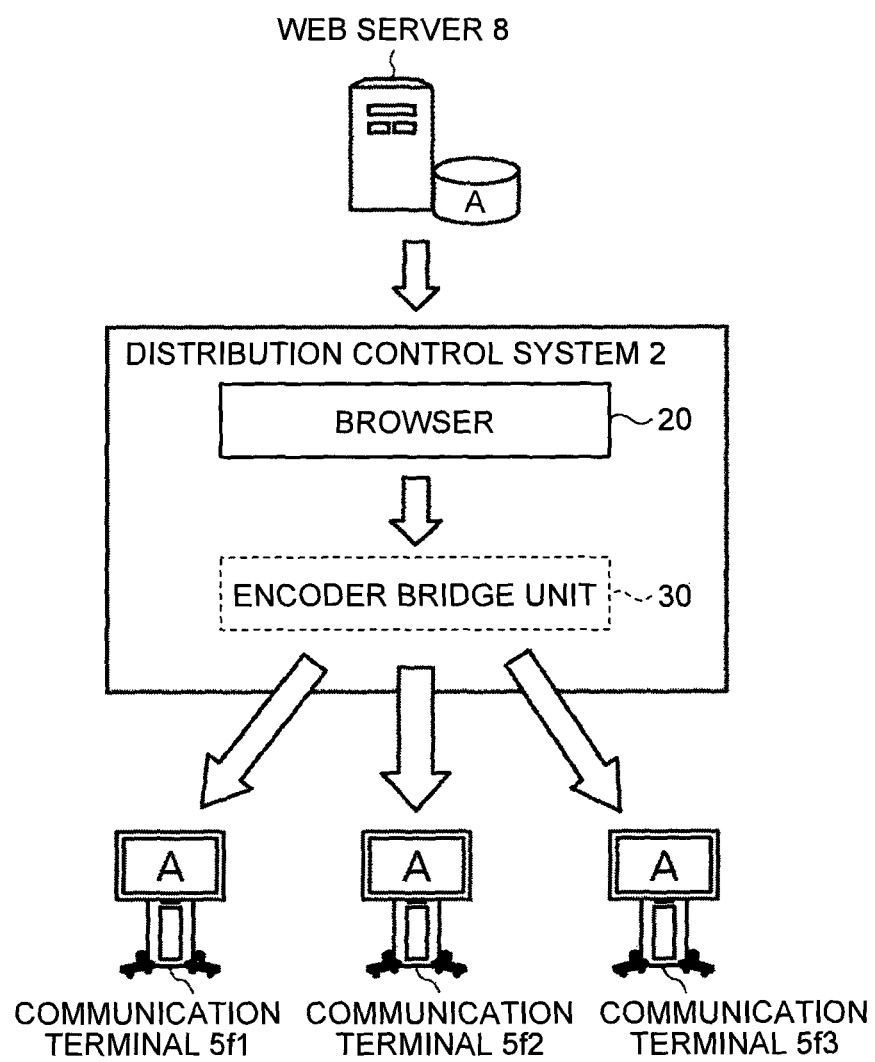
FIG. 4 is a conceptual diagram of multicast.
Figure 5:
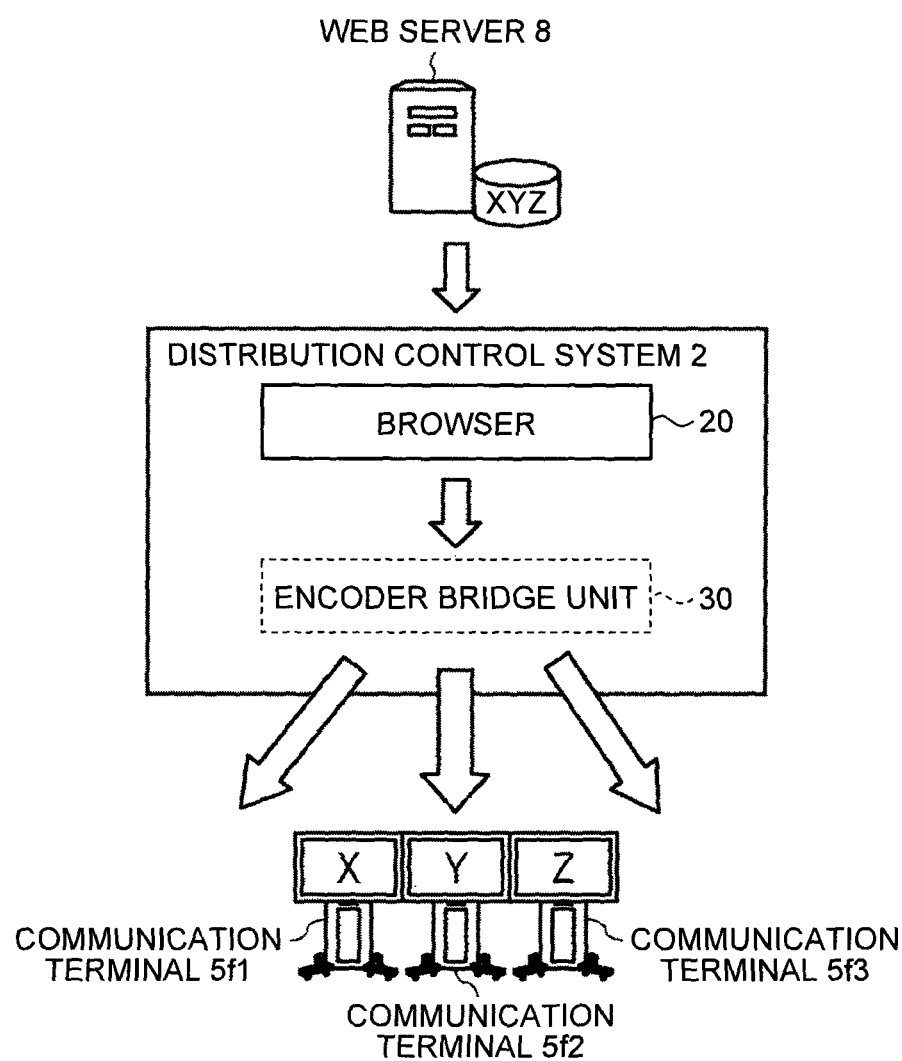
FIG. 5 is a conceptual diagram of multidisplay.
Figure 6:
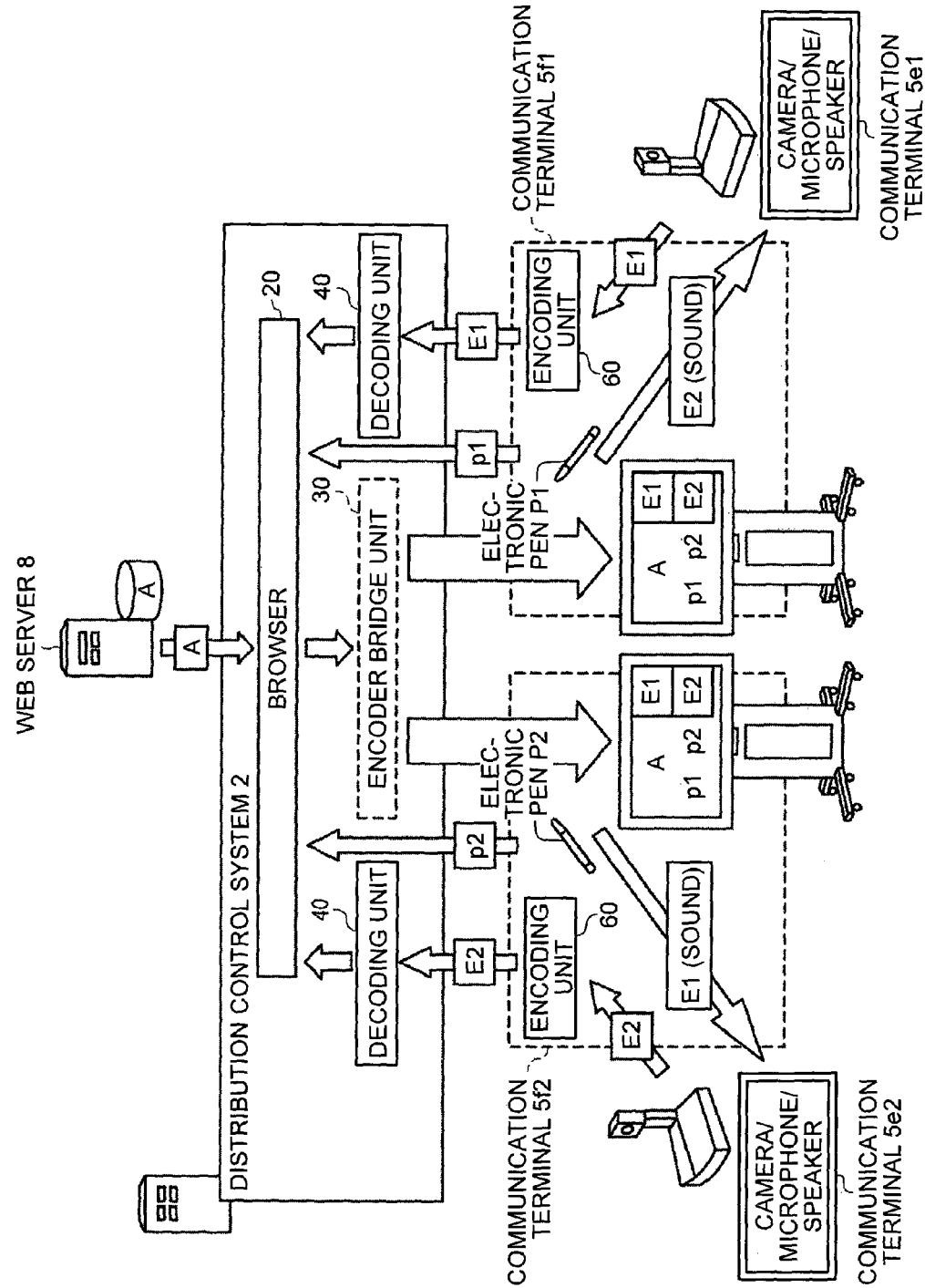
FIG. 6 is a conceptual diagram of composite distribution using a plurality of communication terminals through a distribution control system.

Applying the above distribution method, as illustrated in FIG. 4 to FIG. 6, the distribution system 1 can also distribute web content data to a plurality of sites as video (sound) data. Described below are distribution methods illustrated in FIG. 4 to FIG. 6.

Multicast

FIG. 4 is a conceptual diagram of multicast. As illustrated in FIG. 4, the single browser 20 of the distribution control system 2 acquires the web content data [A] as image (sound) data from the web server 8 and renders it, thereby generating pieces of frame data [A] as still image (sound) data. The encoder bridge unit 30 encodes the pieces of frame data [A], thereby converting them into video (sound) data. The distribution control system 2 then distributes the video (sound) data [A] (an example of transmission data) to a plurality of communication terminals (5f1, 5f2, 5f3).

Thus, the same video (sound) is reproduced at the sites. In this case, the communication terminals (5/1, 5/2, 5/3) do not need to have the same level of display reproduction capability (e.g., the same resolution). The distribution method like this is called, for example, "multicast".

Multidisplay

FIG. 5 is a conceptual diagram of multidisplay. As illustrated in FIG. 5, the single browser 20 of the distribution control system 2 acquires web content data [XYZ] as image (sound) data from the web server 8 and renders it, thereby generating pieces of frame data [XYZ] as still image (sound) data. The encoder bridge unit 30 divides each frame, data [XYZ] into a plurality of pieces of frame data ([X], [Y], [Z]) and then encodes them, thereby converting them into a plurality of pieces of video (sound) data ([X], [Y], [Z]). The distribution control system 2 then distributes the video (sound) data [X] (an example of transmission data) to the communication terminal 5/1. Similarly, the distribution control system 2 distributes the video (sound) data [Y] (an example of transmission data) to the communication terminal 5/2 and distributes the video (sound) data [Z] (an example of transmission data) to the communication terminal 5/3.

Thus, for example, even for landscape web content [XYZ], video (sound) is reproduced by the communication terminals 5 in a divided manner. As a result, when the communication terminals (5/1, 5/2, 5/3) are installed in a line, the same effect can be obtained as the reproduction of one piece of large video. In this case, the communication terminals (5/1, 5/2, 5/3) need to have the same level of display reproduction capability (e.g., the same resolution). The distribution method like this is called, for example, "multidisplay".

Composite Distribution

FIG. 6 is a conceptual diagram of composite distribution using a plurality of communication terminals through a distribution control system. As illustrated in FIG. 6, the communication terminal 5/1 as an electronic blackboard and a communication terminal 5e1 as a teleconference terminal are used at a first site (the right side in FIG. 6), whereas at a second site (the left side in FIG. 6), the communication terminal 5/2 as an electronic blackboard and a communication terminal 5e2 as a teleconference terminal are used similarly. At the first site, an electronic pen P1 is used for drawing characters and the like with strokes on the communication terminal 5/1. At the second site, an electronic pen P2 is used for drawing characters and the like with strokes on the communication terminal 5/2.

At the first site, video (sound) data acquired by the communication terminal 5e1 is encoded by an encoding unit 60 and is then transmitted to the distribution control system 2. After that, it is decoded by a decoding unit 40 of the distribution control system 2 and is then input to the browser 20. Operation data indicating the strokes drawn on the communication terminal 5/1 with the electronic pen P1 (in this case, coordinate data on the display of the communication terminal 5/1 or the like) is transmitted to the distribution control system 2 to be input to the browser 20. Also at the second site, video (sound) data acquired by the communication terminal 5e2 is encoded by the encoding unit 60 and is then transmitted to the distribution control system 2. After that, it is decoded by the decoding unit 40 of the distribution control system 2 and is then input to the browser 20. Operation data indicating the strokes drawn on the communication terminal 5/2 with the electronic pen P2 (in this case, coordinate data on the display of the communication terminal 5/2 or the like) is transmitted to the distribution control system 2 to be input to the browser 20.

The browser 20 acquires, for example, web content data [A] as a background image displayed on the displays of the communication terminals (5/1, 5/2) from the web server 8. The browser 20 combines the web content data [A], operation data ([p1], [p2]), and video (sound) content data ([E1], [E2]) and renders them, thereby generating pieces of frame data as still image (sound) data in which the pieces of content data ([A], [p1], [p2], [E1], [E2]) are arranged in a desired layout. The encoder bridge unit 30 encodes the pieces of frame data, and the distribution control system 2 distributes video (sound) data indicating the same content ([A], [p1], [p2], [E1], [E2]) to both sites. At the first site, thereby video ([A], [p1], [p2], [E1 (video part)], and [E2 (video part)]) is displayed on the display of the communication terminal 5/1, and sound [E2 (sound part)] is output from the speaker of the communication terminal 5e1. Also at the second site, the video ([A], [p1], [p2], [E1 (video part)], and [E2 (video part)]) is displayed on the display of the communication terminal 5/2, and sound [E1 (sound part)] is output from the speaker of the communication terminal 5e2. At the first site, the sound of the site itself [E1 (sound part)] is not output owing to an echo cancelling function of the communication terminal 5/1. At the second site, the sound of the site itself [E2 (sound part)] is not output owing to an echo cancelling function of the communication terminal 5/2.

Thus, at the first site and the second site, remote sharing processing can be performed that shares the same information in real time at remote sites, thus making the distribution system 1 according to the present embodiment effective in a teleconference or the like.

DETAILED DESCRIPTION OF THE EMBODIMENT

The following describes the embodiment in detail with reference to FIG. 7 to FIG. 24.

Hardware Configuration of the Embodiment

Figure 7:
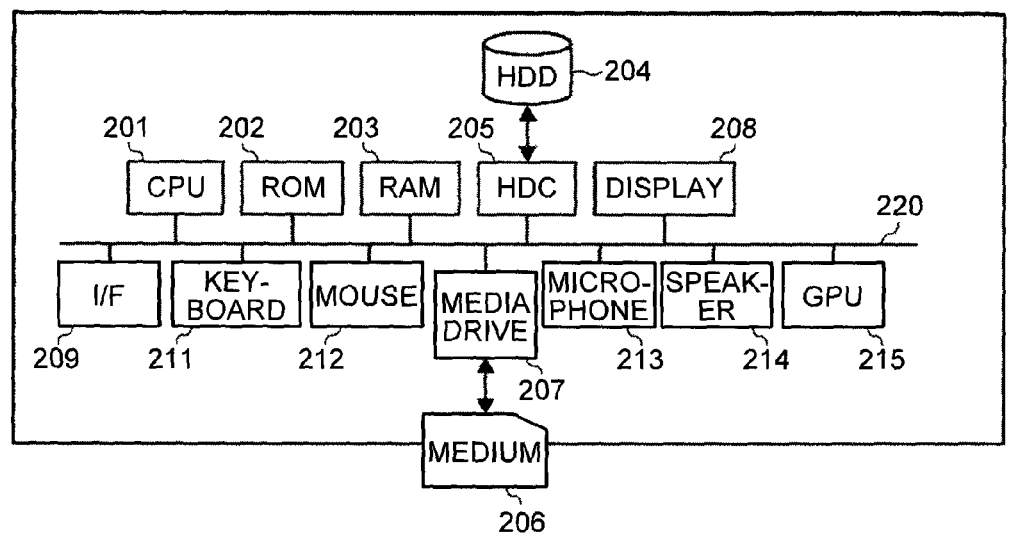
FIG. 7 is a hardware configuration diagram of a distribution control system, a communication terminal, a terminal management system, and a web server.
Figure 8:
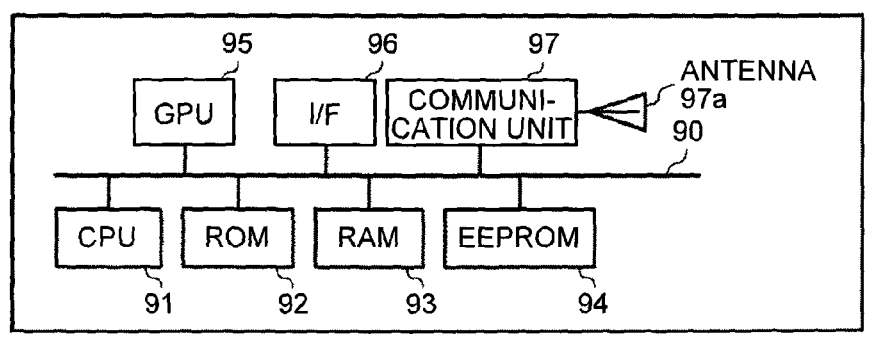
FIG. 8 is a hardware configuration diagram of the dongle.

Described first with reference to FIG. 7 and FIG. 8 is the hardware configuration of the present embodiment. FIG. 7 is a hardware configuration diagram of a distribution control system, a communication terminal, a terminal management system, and a web server. FIG. 8 is a hardware configuration diagram of a dongle. Because the hardware configuration relating to the communication of the communication terminal is the same as part of the hardware configuration of the communication terminal, the description thereof will be omitted.

As illustrated in FIG. 7, the distribution control system 2 includes: a CPU 201 that controls the entire operation of the distribution control system 2; a read-only memory (ROM) 202 that stores therein a program used for driving the CPU 201 such as IPL; a RAM 203 used as a work area of the CPU 201; an HDD 204 that stores therein various kinds of data such as programs; a hard disk controller (HDC) 205 that controls the reading and writing of the various kinds of data from and into the HDD 204 under the control of the CPU 201; a media drive 207 that controls the reading and writing of data from and into a storage medium 206 such as a flash memory; a display 208 that displays various kinds of information; an interface (I/F) 209 that transmits data through the communication network 9 and to which the dongle 99 is connected; a keyboard 211; a mouse 212; a microphone 213; a speaker 214; a graphics processing unit (GPU) 215; and a bus line 220 such as an address bus or a data bus for electrically connecting the above components as illustrated in FIG. 7. As in the communication terminal. 5*d* as a projector, the GPU may not be provided. Because the hardware configuration of the terminal management system 7 and the web server 8 is the same as the hardware configuration of the distribution control system 2, the description thereof will be omitted.

Described next with reference to FIG. 8 is the hardware configuration of the dongle 99 illustrated in FIG. 2. As illustrated in FIG. 8, the dongle 99 includes: a CPU 91 that controls the entire operation of the dongle 99; a ROM 92 that stores therein a basic input/output program; a RAM 93 used as a work area of the CPU 91; an electrically erasable and programmable ROM (EEPROM) 94 that performs the reading and writing of data under the control of the CPU 91; a GPU 95; an interface I/F 96 for connection to the I/F 209 of the communication terminal 5; an antenna 97*a*; a communication unit 97 that performs communications by a short-distance wireless technology through the antenna 97*a*; and a bus line 90 such as an address bus or a data bus for electrically connecting the above units. Examples of the short-distance wireless technology include the Near Field Communication (NFC) standards, Bluetooth (registered trademark), Wireless Fidelity (WiFi), and ZigBee (registered trademark). Because the dongle. 99 includes the GPU 95, even when no GPU is included as in the communication terminal 5*d*, the communication terminal 5 can perform calculation processing needed for graphics display with the dongle 99 attached as illustrated in FIG. 2.

Functional Configuration of the Embodiment

The functional configuration of the embodiment is described next with reference to FIG. 9 to FIG. 16.

Functional Configuration of the Distribution Control System

Figure 9:
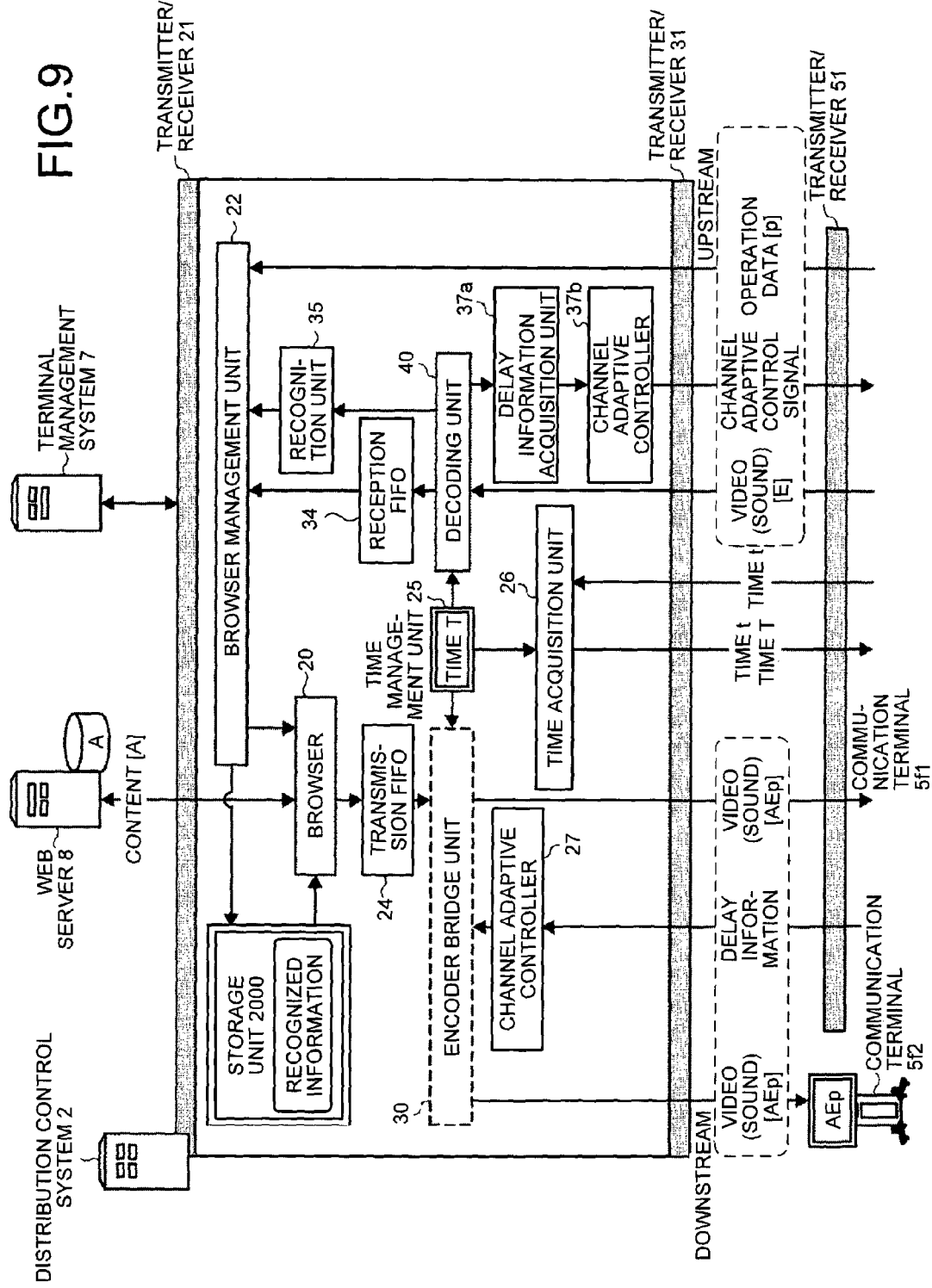
FIG. 9 is a functional block diagram illustrating mainly the functions of the distribution control system.

Described first with reference to FIG. 9 is the functional configuration of the distribution control system 2. FIG. 9 is a functional block diagram illustrating mainly the functions of the distribution control system. FIG. 9 illustrates a functional configuration where the distribution control system 2 distributes video (sound) data to the communication terminal 5*f*1, and the distribution control system 2 has the same functional configuration also where the distribution destination is other than the communication terminal 5*f*1. Although the distribution control system 2 includes a plurality of distribution engine servers, the following describes a case where a single distribution engine server is included, in order to simplify the description.

As illustrated in FIG. 9, the distribution control system 2 has functional components in FIG. 9 implemented by the hardware configuration including the CPU 201 and the programs illustrated in FIG. 7.

Specifically, the distribution control system 2 includes the browser 20, a transmitter/receiver 21, browser management unit 22, a transmission first-in first-out (FIFO) buffer 24, a time management unit 25, a time acquisition unit 26, a channel adaptive controller 27, the encoder bridge unit 30, a transmitter/receiver 31, a reception FIFO 34, a recognition unit 35, a delay information acquisition unit 37*a*, a channel adaptive controller 37*b*, and the decoding unit 40. The distribution control system 2 further includes a storage unit 2000 implemented by the HDD 204 illustrated in FIG. 7. This storage unit 2000 stores therein recognition information (described below) output from the recognition unit 35 and sent through the browser management unit 22. The content data acquired by the browser 20 can be temporarily stored in the storage unit 2000 as a cache.

Among the above functional components, the browser 20 is a browser that operates within the distribution control system 2. The browser 20 is kept updated along with the enrichment of web content at all times. The browser 20 includes Media Player, Flash Player, JavaScript (registered trademark), CSS, and HTML Renderer. JavaScript includes the standardized product and one unique to the distribution system 1.

Media Player is a browser plug-in for reproducing multimedia files such as video (sound) files within the browser 20. Flash Player is a browser plug-in for reproducing flash content within the browser 20. The unique JavaScript is a JavaScript group that provides the application programming interface (API) of services unique to the distribution system 1. CSS is a technology for efficiently defining the appearance and style of web pages described in HTML. HTML Renderer is an HTML rendering engine.

A renderer renders content data such as web content data as image (sound) data, thereby generating pieces of frame data as still image (sound) data. As illustrated in FIG. 6, the renderer is also a layout engine that lays out a plurality of kinds of content ([A], [p1], [p2], [E1], [E2]).

The distribution system 1 according to the present embodiment provides the browsers 20 within the distribution control system 2, and a cloud browser for use in a user session is selected from the browsers 20. The following describes a case where the single browser 20 is provided, in order to simplify the description.

The transmitter/receiver 21 transmits and receives various kinds of data, various kinds of requests, various kinds of instructions, and the like to and from the terminal management system 7 and the web server 8. For example, the transmitter/receiver 21 acquires web content data from a content site at the web server 8. The transmitter/receiver 21 outputs the various kinds of data acquired from the terminal management system 7 to the functional components within the distribution control system 2 and controls the functional components within the distribution control system 2 based on the various kinds of data, various kinds of requests, various kinds of instructions, and the like acquired from the terminal management system 7. For example, for the browsers 20, the transmitter/receiver 21 outputs a request for switching distribution pattern from the terminal management system 7, to the browser management unit 22. The browser management unit 22 then controls switching from one browser to another browser among the browsers. Based on the request for switching distribution from the terminal management system 7, the transmitter/receiver 21 performs the switching of combinations of the components within the encoder bridge unit 30 illustrated in FIG. 15 and FIG. 16.

The browser management unit 22 manages the browser 20. For example, the browser management unit 22 instructs the browser 20 to start up and exit, and numbers an encoder ID at startup or exit. The encoder ID is identification information that the browser management unit 22 numbers in order to manage the process of the encoder bridge unit 30. The browser management unit 22 numbers and manages a browser ID every time the browser 20 is started up. The browser ID is identification information that the browser management unit 22 numbers in order to manage the process of the browser 20 to identify the browser 20.

The browser management unit 22 acquires various kinds of operation data from the communication terminal 5 through the transmitter/receiver 31 and outputs them to the browser 20. The operation data is data generated through operation events (operations through the keyboard 211, the mouse 212, and the like, strokes with an electronic pen P and the like) on the communication terminal 5. When the communication terminal 5 provides various sensors such as a temperature sensor, a humidity sensor, and an acceleration sensor, the browser management unit 22 acquires sensor information that contains output signals of the sensors from the communication terminal 5 and outputs it to the browser 20. The browser management unit 22 further acquires image (sound) data from the recognition unit 35 and outputs it to the browser 20, and acquires recognition information described below from the recognition unit 35 and stores it in the storage unit 2000. The browser management unit 22 acquires video (sound) data from the reception FIFO buffer 34 and outputs it to the browser 20.

The transmission FIFO 24 is a buffer that stores therein pieces of frame data as still image (sound) data generated by the browser 20.

The time management unit 25 manages time T unique to the distribution control system 2.

The time acquisition unit 26 performs time adjustment processing in conjunction with a time controller 56 in the communication terminal 5 described below. Specifically, the time acquisition unit 26 acquires time information (T) indicating time T in the distribution control system 2 from the time management unit 25, receives time information (t) indicating time t in the communication terminal 5 from the time controller 56 described below through the transmitter/receiver 31 and a transmitter/receiver 51, and transmits the time information (t) and the time information (T) to the time controller 56.

The channel adaptive controller 27 calculates reproduction delay time U based on transmission delay time information (D) and calculates operation conditions such as the frame rate and the data resolution of a converter 10 in the encoder bridge unit 30. This reproduction delay time is time for delaying reproduction through the buffering of data until being reproduced. In other words, the channel adaptive controller 27 changes the operation of the encoder bridge unit 30 based on the transmission delay time information (D) and the size of the data (e.g., the number of bits or the number of bytes). The transmission delay time information (D) indicates frequency distribution information based on a plurality of pieces of transmission delay time D1 acquired by a delay information acquisition unit 57 of the communication terminal 5. The transmission delay time D1 indicates time from the point when the video (sound) data is transmitted from the distribution control system 2 to the point when it is received by the communication terminal 5, and is acquired from a reproduction controller 53.

The encoder bridge unit 30 outputs pieces of frame data as still image (sound) data generated by the browser 20 to the converter 10 in the encoder bridge unit 30 described below. In this case, the encoder bridge unit 30 also operates based on the operation conditions calculated by the channel adaptive controller 27. The encoder bridge unit 30 will be described in more detail with reference to FIG. 15 and FIG. 16. FIG. 15 is a detailed diagram of the encoder bridge unit. FIG. 16 is a functional block diagram illustrating the functions of the converter.

As illustrated in FIG. 15, the encoder bridge unit 30 includes a creating/selecting unit 310, a selecting unit 320, and a plurality of converters (10a, 10b, 10c) provided therebetween. Although the three converters are illustrated here, any number of them may be provided. In the following, any converter is referred to as a "converter 10".

The converter 10 converts the data format of the pieces of frame data as still image (sound) data generated by the browser 20 into a data format of H.264 or the like allowing distribution of the data to the communication terminal 5 through the communication network 9. For that purpose, as illustrated in FIG. 16, the converter 10 includes a trimming unit 11, a resizing unit 12, a dividing unit 13, and the encoding unit 19. The trimming unit 11, the resizing unit 12, and the dividing unit 13 do not perform any processing on sound data.

The trimming unit 11 performs processing to cut out part of a still image. The resizing unit 12 changes the scale of a still image. The dividing unit 13 divides a still image as illustrated in FIG. 5.

The encoding unit 19 encodes the pieces of frame data as still image (sound) data generated by the browser 20, thereby converting them to distribute video (sound) data to the communication terminal 5 through the communication network 9. When the video is not in motion (when there is no inter-frame change), a skip frame is thereafter inserted until the video moves to save a band.

When sound data is generated together with still image data by rendering, both pieces of data are encoded, and when only sound data is generated, only encoding is performed to compress data without trimming, resizing, and dividing.

The creating/selecting unit 310 creates a new converter 10 or selects pieces of frame data as still image (sound) data to be input to a converter 10 that is already generated. In the creation, the creating/selecting unit 310 creates a converter 10 capable of conversion according to the capability of the communication terminal 5 to reproduce video (sound) data. In the selection, a converter 10 that is already generated is selected. For example, in starting distribution to the communication terminal 5b in addition to distribution to the communication terminal 5a, the same video (sound) data as video (sound) data being distributed to the communication terminal 5a may be distributed to the communication terminal 5b. In such a case, furthermore, when the communication terminal 5b has the same level of capability as the capability of the communication terminal 5a to reproduce video (sound) data, the creating/selecting unit 310 uses the converter 10a that is already created for the communication terminal 5a, without creating a new converter 10b for the communication terminal 5b.

The selecting unit 320 selects a desired one from the converters 10 that are already generated. The selection by the creating/selecting unit 310 and the selecting unit 320 allows distribution in various patterns as illustrated in FIG. 6.

The transmitter/receiver 31 transmits and receives various data, requests, and the like to and from the communication terminal 5. This transmitter/receiver 31 transmits various data, requests, and the like to the communication terminal 5 through the communication network 9 from the cloud, thereby allowing the distribution control system 2 to distribute various data, requests, and the like to the communication terminal 5. For example, in the login processing of the communication terminal 5, the transmitter/receiver 31 transmits, to the transmitter/receiver 51 of the communication terminal 5, authentication screen data for prompting a user for a login request. The transmitter/receiver 31 also performs data transmission and data reception to and from user applications of the communication terminal 5 and device applications of the communication terminal 5 by a protocol unique to the distribution system 1 through a Hypertext Transfer Protocol over Secure Socket Layer (HTTPS) server. This unique protocol is an HTTPS-based application layer protocol for transmitting and receiving data in real time without being interrupted between the distribution control system 2 and the communication terminal. The transmitter/receiver 31 also performs transmission response control, real-time data creation, command transmission, reception response control, reception data analysis, and gesture conversion.

The transmission response control is processing to manage an HTTPS session for downloading requested from the communication terminal 5 in order to transmit data from the distribution control system 2 to the communication terminal 5. The response of the HTTPS session for downloading does not end immediately and holds for a certain period of time (one to several minutes). The transmitter/receiver 31 dynamically writes data to be sent to the communication terminal 5 in the body part of the response. In order to eliminate costs for reconnection, another request is allowed to reach from the communication terminal before the previous session ends. By putting the transmitter/receiver 31 on standby until the previous request is completed, overhead can be eliminated even when reconnection is performed.

The real-time data creation is processing to give a unique header to the data of compressed video (and a compressed sound) generated by the encoding unit 19 in FIG. 16 and write it in the body part of HTTPS.

The command transmission is processing to generate command data to be transmitted to the communication terminal 5 and write it in the body part of HTTPS directed to the communication terminal 5.

The reception response control is processing to manage an HTTPS session requested from the communication terminal 5 in order for the distribution control system 2 to receive data from the communication terminal 5. The response of this HTTPS session does not end immediately and is held for a certain period of time (one to several minutes). The communication terminal 5 dynamically writes data to be sent to the transmitter/receiver 31 of the distribution control system 2 in the body part of the request.

The reception data analysis is processing to analyze the data transmitted from the communication terminal 5 by type and deliver the data to a necessary process.

The gesture conversion is processing to convert a gesture event input to the communication terminal 5f as the electronic blackboard by a user with an electronic pen or in handwriting into data in a format receivable by the browser 20.

The reception FIFO 34 is a buffer that stores therein video (sound) data decoded by the decoding unit 40.

The recognition unit 35 performs processing on image (sound) data received from the communication terminal 5. Specifically, for example, the recognition unit 35 recognizes the face, age, sex, and the like of a human or animal based on images taken by a camera 62 for signage. In a workplace, the recognition unit 35 performs name tagging by face recognition and processing of replacing a background image based on images taken by the camera 62. The recognition unit 35 stores recognition information indicating the recognized details in the storage unit 2000. The recognition unit 35 achieves speeding up by performing processing with a recognition expansion board.

The delay information acquisition unit 37a is used for the processing of upstream channel adaptive control and corresponds to the delay information acquisition unit 57 of the communication terminal 5 for use in the processing of downstream channel adaptive control. Specifically, the delay information acquisition unit 37a acquires transmission delay time information (d1) indicating transmission delay time d1 from the decoding unit 40 and holds it for a certain period of time, and when a plurality of pieces of transmission delay time information (d1) are acquired, outputs to the channel adaptive controller 37b transmission delay time information (d) indicating frequency distribution information based on a plurality of pieces of transmission delay time d1. The transmission delay time information (d1) indicates transmission delay time indicating time from the point when the video (sound) data is transmitted from the communication terminal 5 to the point when it is received by the distribution control system 2.

The channel adaptive controller 37b is used for the processing of the upstream channel adaptive control and corresponds to the channel adaptive controller 27 for use in the processing of the downstream channel adaptive control. Specifically, the channel adaptive controller 37b calculates the operation conditions of the encoding unit 60 of the communication terminal 5 based on the transmission delay time information (d). The channel adaptive controller 37b transmits a channel adaptive control signal indicating operation conditions such as a frame rate and data resolution to the encoding unit 60 of the communication terminal 5 through the transmitter/receiver 31 and the transmitter/receiver 51.

The decoding unit 40 decodes the video (sound) data transmitted from the communication terminal 5. The decoding unit 40 also outputs the transmission delay time information (d1) indicating transmission delay time d1 to the delay information acquisition unit 37a.

Functional Configuration of Communication Terminal

Figure 10:
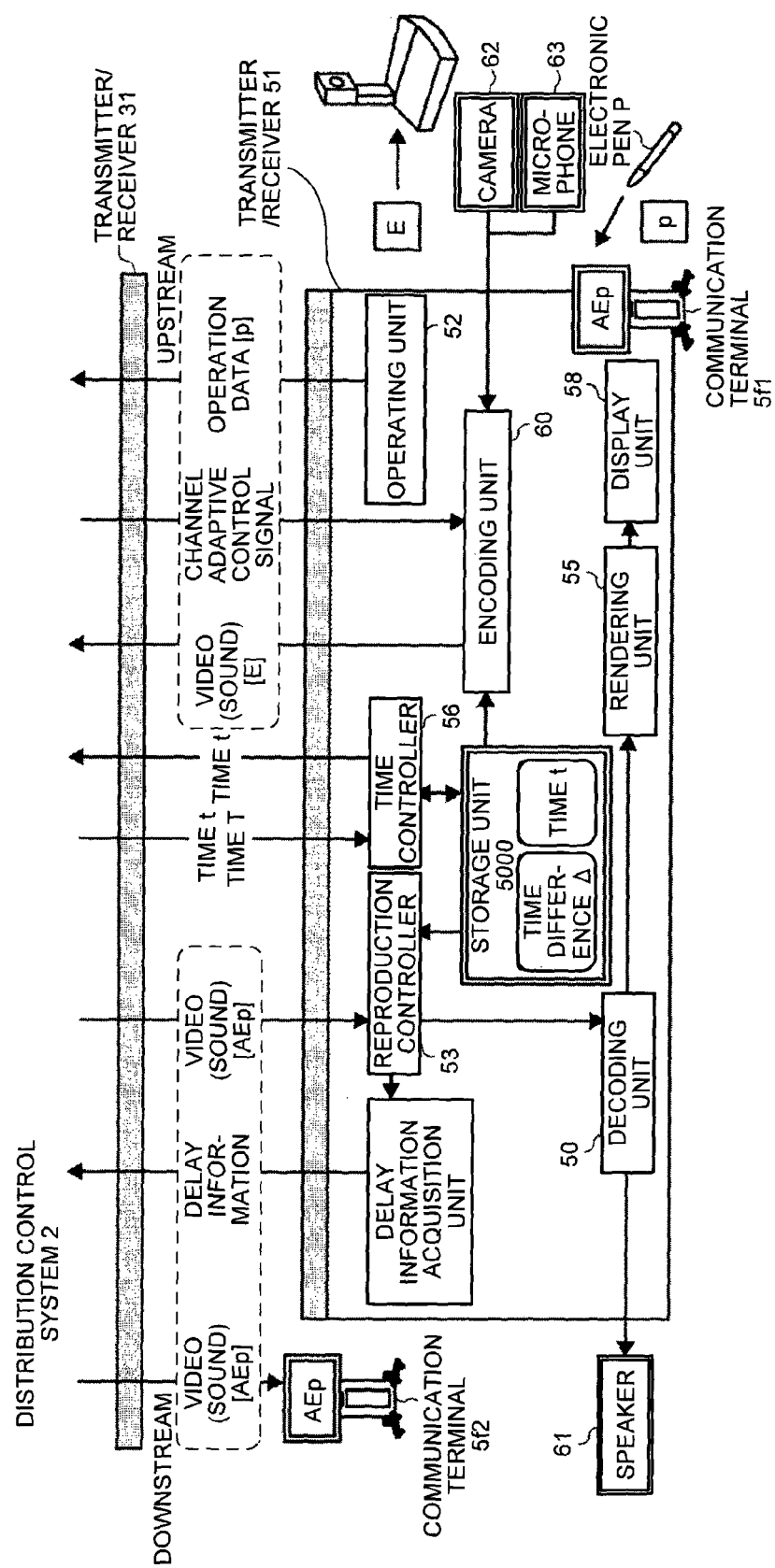
FIG. 10 is a functional block diagram illustrating mainly the functions of the communication terminal.

The functional configuration of the communication terminal 5 is described with reference to FIG. 10. FIG. 10 is a functional block diagram illustrating mainly the functions of the communication terminal. The communication terminal 5 is a terminal serving as an interface for a user to perform a login to the distribution system 1, start and stop the distribution of video (sound) data, and the like.

As illustrated in FIG. 10, the communication terminal 5 has functional components in FIG. 10 implemented by the hardware configuration including the CPU 201 and the programs illustrated in FIG. 7. When the communication terminal 5 becomes communicable with the other terminals and systems through the communication network 9 by the insertion of the dongle 99 as illustrated in FIG. 2, the communication terminal 5 has the functional components in FIG. 10 implemented by the hardware configuration and the programs illustrated in FIG. 7 and FIG. 8.

Specifically, the communication terminal 5 includes a decoding unit 50, the transmitter/receiver 51, an operating unit 52, the reproduction controller 53, a rendering unit 55, the time controller 56, the delay information acquisition unit 57, a display unit 58, and the encoding unit 60. The communication terminal 5 further includes a storage unit 5000 implemented by the RAM 203 illustrated in FIG. 7. This storage unit 5000 stores therein time difference information ($\Delta$) indicating a time difference $\Delta$ described below and time information (t) indicating time t in the communication terminal 5.

The decoding unit 50 decodes video (sound) data distributed from the distribution control system 2 and output from the reproduction controller 53.

The transmitter/receiver 51 transmits and receives various data, requests, and the like to and from the transmitter/receiver 31 of the distribution control system 2 and a transmitter/receiver 71a of the terminal management system 7. For example, in the login processing of the communication terminal 5, the transmitter/receiver 51 performs a login request to the transmitter/receiver 71 of the terminal management system 7 in response to the startup of the communication terminal 5 by the operating unit 52.

The operating unit 52 performs processing to receive operations input by a user, such as input and selection with a power switch, a keyboard, a mouse, the electronic pen P, and the like, and transmits them as operation data to the browser management unit 22 of the distribution control system 2.

The reproduction controller 53 buffers the video (sound) data (a packet of real-time data) received from the transmitter/receiver 51 and outputs it to the decoding unit 50 with the reproduction delay time U taken into account. The reproduction controller 53 also calculates the transmission delay time information (D1) indicating transmission delay time D1, and outputs the transmission delay time information (D1) to the delay information acquisition unit 57. The transmission delay time information (D1) indicates time from the point when the video (sound) data is transmitted from the distribution control system 2 to the point when it is received by the communication terminal 5.

The rendering unit 55 renders the data decoded by the decoding unit 50.

The time controller 56 performs time adjustment processing in conjunction with the time acquisition unit 26 of the distribution control system 2. Specifically, the time controller 56 acquires time information (t) indicating time t in the communication terminal 5 from the storage unit 5000. The time controller 56 issues a request for time information (T) indicating time T in the distribution control system 2 to the time acquisition unit 26 of the distribution control system 2 through the transmitter/receiver 51 and the transmitter/receiver 31. In this case, the time information (t) is transmitted concurrently with the request for the time information (T).

The delay information acquisition unit 57 acquires from the reproduction controller 53 the transmission delay time information (D1) indicating transmission delay time D1 and holds it for a certain period of time, and when a plurality of pieces of transmission delay time information (D1) are acquired, outputs transmission delay time information (D) indicating frequency distribution information based on a plurality of pieces of transmission delay time D1 to the channel adaptive controller 27 through the transmitter/receiver 51 and the transmitter/receiver 31. The transmission delay time information (D) is transmitted, for example, once in a hundred frames.

The display unit 58 reproduces the data rendered by the rendering unit 55.

The encoding unit 60 transmits video (sound) data [E] that is acquired from a built-in microphone 213 or the camera 62 and a microphone 63 that are externally attached, and is encoded; time information ($t_0$) that indicates the current time $t_0$ in the communication terminal 5 and is acquired from the storage unit 5000; and the time difference information ($\Delta$) that indicates the time difference $\Delta$ in between the distribution control system 2 and the communication terminal 5 and is acquired from the storage unit 5000, to the decoding unit 40 of the distribution control system 2 through the transmitter/receiver 51 and the transmitter/receiver 31. The encoding unit 60 changes the operation conditions of the encoding unit 60 based on the operation conditions indicated by the channel adaptive control signal received from the channel adaptive controller 37b. The encoding unit 60, in accordance with the new operation conditions, transmits the video (sound) data [E] that is acquired from the camera 62 and the microphone 63 and is encoded; the time information ($t_0$) that indicates the current time $t_0$ in the communication terminal 5 and is acquired from the storage unit 5000; and the time difference information ($\Delta$) that indicates the time difference $\Delta$ and is acquired from the storage unit 5000, to the decoding unit 40 of the distribution control system 2 through the transmitter/receiver 51 and the transmitter/receiver 31.

The built-in microphone 213, the externally attached camera 62 and microphone 63, and the like are examples of an inputting unit and are devices that need encoding and decoding. The inputting unit may output touch data and smell data in addition to video (sound) data.

The inputting unit includes various sensors such as a temperature sensor, a direction sensor, an acceleration sensor, and the like.

Functional Configuration of the Terminal Management System

Figure 11:
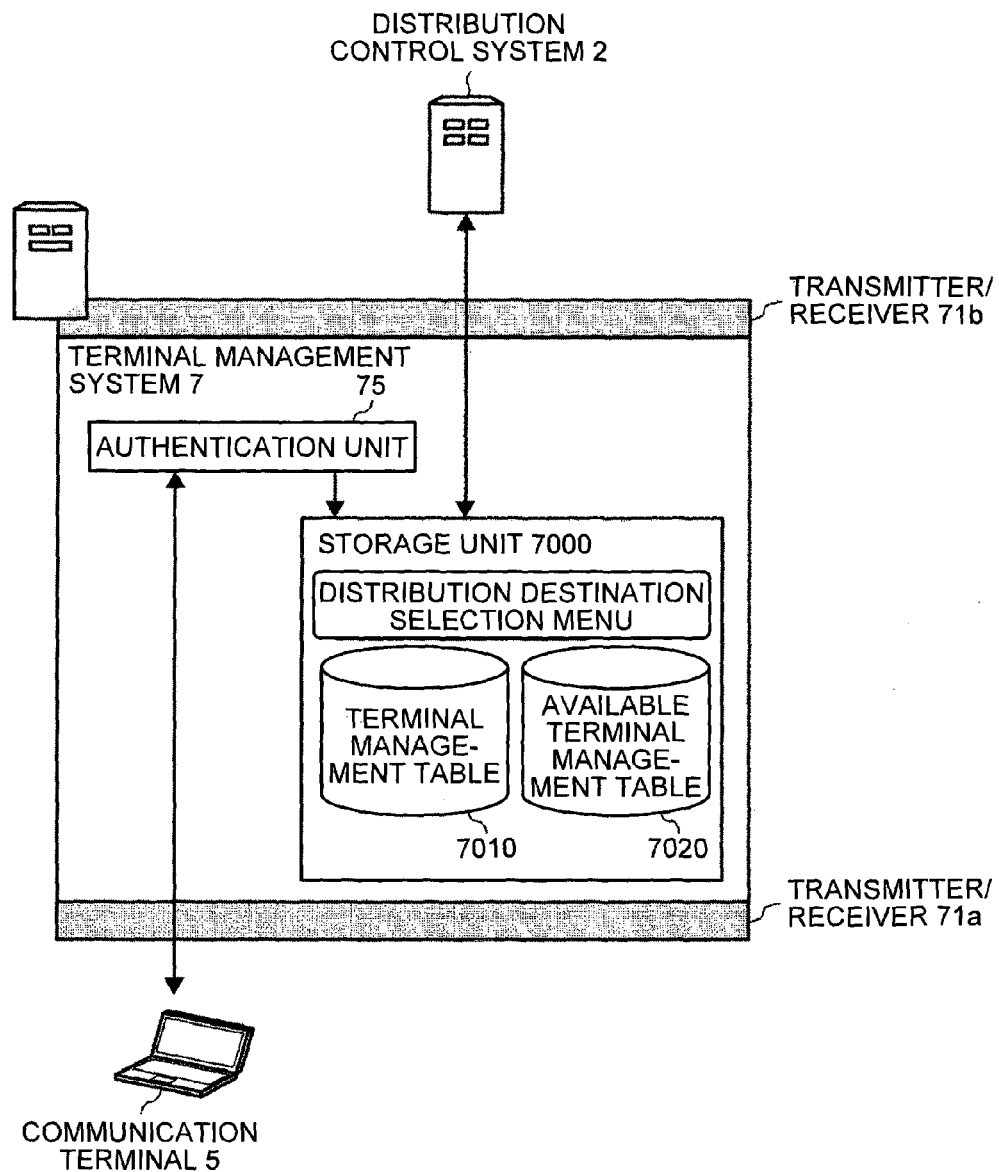
FIG. 11 is a functional block diagram illustrating the functions of the terminal management system.

The functional configuration of the terminal management system 7 is described with reference to FIG. 11. FIG. 11 is a functional block diagram illustrating the functions of the terminal management system.

As illustrated in FIG. 11, the terminal management system 7 has functional components in FIG. 11 implemented by the hardware configuration including the CPU 201 and the programs illustrated in FIG. 7.

Specifically, the terminal management system 7 includes the transmitter/receiver 71a, a transmitter/receiver 71b, and an authentication unit 75. The terminal management system 7 further includes a storage unit 7000 implemented by the HDD 204 illustrated in FIG. 7. The storage unit 7000 stores therein distribution destination selection menu data, a terminal management table 7010, and an available terminal management table 7020.

The distribution destination selection menu is data indicating such a destination selection menu screen as illustrated in FIG. 12.

As illustrated in FIG. 13, the terminal management table 7010 manages the terminal ID of the communication terminal 5, a user certificate, contract information when a user uses the services of the distribution system 1, the terminal type of the communication terminal 5, setting information indicating the home uniform resource locators (URLs) of the respective communication terminals 5, the execution environment information of the communication terminals 5, a shared ID, installation position information, and display name information in association with each other. The execution environment information includes "favorites", "previous Cookie information", and "cache file" of each communication terminal 5, which are sent to the distribution control system 2 together with the setting information after the login of the communication terminal 5 and are used for performing an individual service on the communication terminal 5.

The shared ID is an ID that is used when each user distributes the same video (sound) data as video (sound) data being distributed to his/her own communication terminal 5 to the other communication terminals 5, thereby performing remote sharing processing, and is identification information that identifies the other communication terminals and the other communication terminal group. For example, the shared ID of the terminal ID "t006" is "v006", the shared ID of the terminal ID "t007" is "v006", and the shared ID of the terminal ID "t008" is "v006". When the communication terminal 5a with the terminal ID "t001" issues a request for remote sharing processing with the communication terminals (5f1, 5f2, 5f3) with the terminal ID "v006", the distribution control system 2 distributes the same video (sound) data as video (sound) data being distributed to the communication terminals 5a to the communication terminals (5f1, 5f2, 5f3). However, when the communication terminals 5a and the communication terminals (5f1, 5f2, 5f3) are different in the resolution of the display unit 58, the distribution control system 2 distributes the video (sound) data accordingly.

As illustrated in FIG. 5, for example, the installation position information indicates an installation position when the communication terminals (5/1, 5/2, 5/3) are arranged side by side. The display name information is information indicating the details of the display name in the distribution destination selection menu illustrated in FIG. 12.

As illustrated in FIG. 14, the available terminal management table 7020 manages, in association with each terminal ID, a shared ID indicating a communication terminal or a communication terminal group with which the communication terminal 5 indicated by the terminal ID can perform remote sharing processing.

The functional components are described with reference to FIG. 11.

The transmitter/receiver 71a transmits and receives various data, requests, and the like to and from the communication terminal 5. For example, the transmitter/receiver 71a receives a login request from the transmitter/receiver 51 of the communication terminal 5 and transmits an authentication result of the login request to the transmitter/receiver 51.

The transmitter/receiver 71b transmits and receives various data, requests, and the like to and from the distribution control system 2. For example, the transmitter/receiver 71b receives a request for the data of the distribution destination selection menu from the transmitter/receiver 21 of the distribution control system 2 and transmits the data of the distribution destination selection menu to the transmitter/receiver 21.

The authentication unit 75 searches the terminal management table 7010 based on the terminal ID and the user certificate received from the communication terminal 5, thereby determining whether there is the same combination of a terminal ID and a user certificate, thereby authenticating the communication terminal 5.

Operations and Processing of the Embodiment

Operations and pieces of processing of the present embodiment are described with reference to FIG. 17 to FIG. 24. These pieces of processing are performed by the CPUs of the distribution control system 2, the communication terminal 5, the terminal management system 7, and the web server 8 in accordance with the respective programs stored therein.

Basic Distribution Processing

Figure 17:
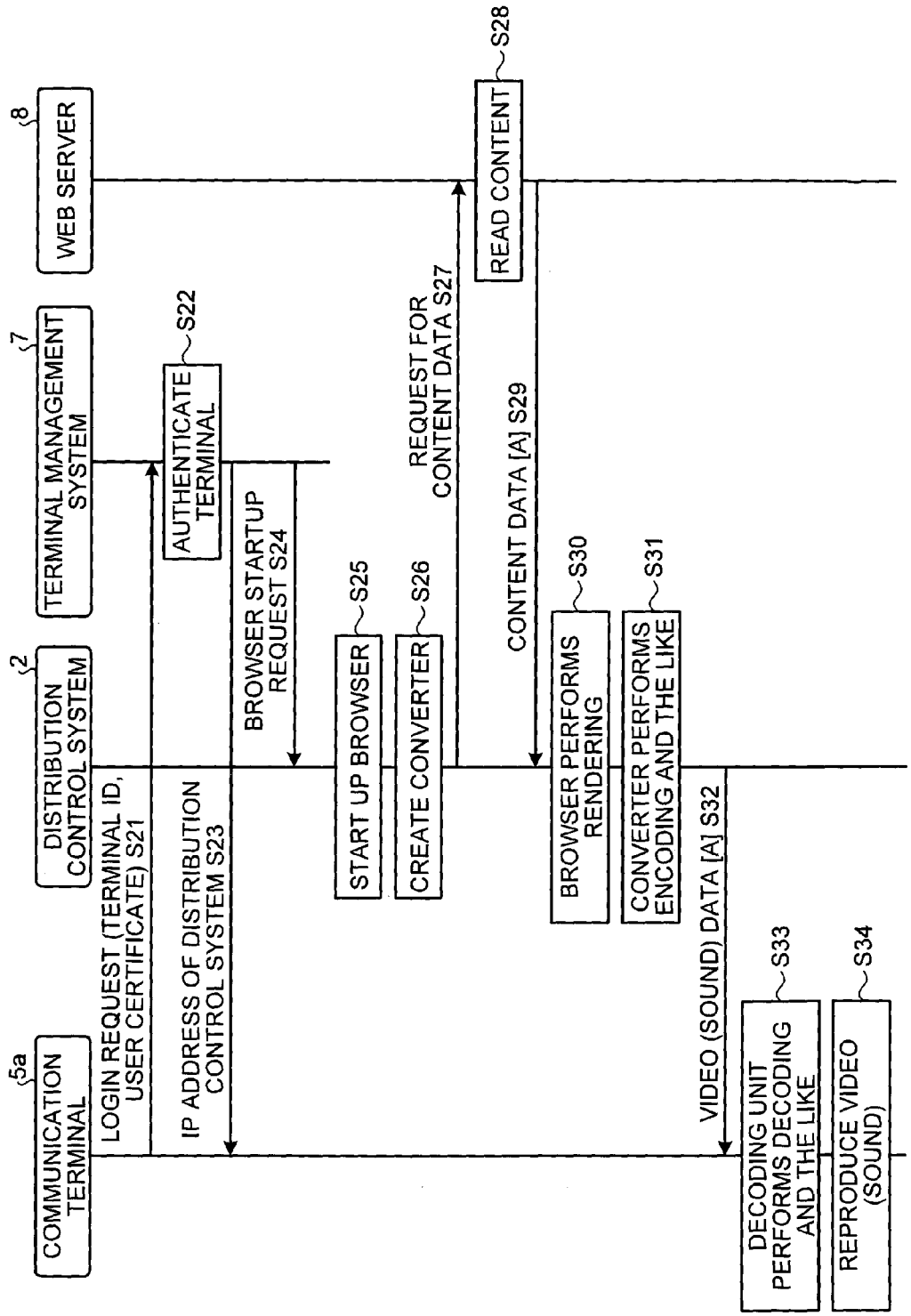
FIG. 17 is a sequence diagram illustrating basic distribution processing of the distribution control system.

Specific distribution processing in the basic distribution method illustrated in FIG. 3 is described with reference to FIG. 17. FIG. 17 is a sequence diagram illustrating the basic distribution processing of the distribution control system. Although described here is a case of issuing a login request through the communication terminal 5a, a login may be performed through the communication terminal 5 other than the communication terminal 5a.

As illustrated in FIG. 17, when a user turns on the communication terminal 5a, the transmitter/receiver 51 of the communication terminal 5a issues a login request to the transmitter/receiver 71a of the terminal management system 7 (Step S21). The transmitter/receiver 71a receives the login request. This login request includes the terminal ID and the user certificate of the communication terminal 5a. The authentication unit 75 then acquires the terminal ID and the user certificate of the communication terminal 5a.

The authentication unit 75 searches the terminal management table 7010 based on the terminal ID and the user certificate, thereby determining whether there is the same combination of a terminal ID and a user certificate, thereby authenticating the communication terminal 5a (Step S22). The following describes a case where the same combination of a terminal ID and a user certificate is present in the terminal management table 7010, that is, where the communication terminal 5a is determined as a valid terminal in the distribution system 1.

The transmitter/receiver 71a of the terminal management system 7 transmits the IP address of the distribution control system 2 to the transmitter/receiver 51 of the communication terminal 5a (Step S23). The IP address of the distribution control system 2 is acquired from the distribution control system 2 by the terminal management system 7 and is stored in the storage unit 7000 in advance.

The transmitter/receiver 71b of the terminal management system 7 issues a startup request of the browser 20 to the transmitter/receiver 21 of the distribution control system 2 (Step S24). The transmitter/receiver 21 receives the startup request of the browser 20. The browser management unit 22 starts up the browser 20 based on the startup request received by the transmitter/receiver 21 (Step S25).

The creating/selecting unit 310 of the encoder bridge unit 30 creates the converter 10 in accordance with the capability of the communication terminal 5a to reproduce video (sound) data (the resolution of the display and the like) and the type of content (Step S26). Next, the transmitter/receiver 21 issues a request for content data [A] to the web server 8 in accordance with an instruction by the browser 20 (Step S27). In response thereto, the web server 8 reads the requested content data [A] from its own storage unit (not illustrated) (Step S28). The web server 8 then transmits the content data [A] to the transmitter/receiver 21 of the distribution control system 2 (Step S29).

The browser 20 renders the content data [A] received by the transmitter/receiver 21, thereby generating pieces of frame data as still image (sound) data and outputs them to the transmission FIFO 24 (Step S30). The converter 10 encodes the pieces of frame data stored in the transmission FIFO 24, thereby converting them into video (sound) data [A] to be distributed to the communication terminal 5a (Step S31).

The transmitter/receiver 31 transmits the video (sound) data [A] to the transmitter/receiver 51 of the communication terminal 5a (Step S32). The transmitter/receiver 51 of the communication terminal 5a receives the video (sound) data [A] and outputs it to the reproduction controller 53.

In the communication terminal 5a, the decoding unit 50 acquires the video (sound) data [A] from the reproduction controller 53 and decodes it (Step S33). After that, a speaker 61 reproduces sound based on decoded sound data [A], and the display unit 58 reproduces video based on video data [A] acquired from the decoding unit 50 and rendered by the rendering unit 55 (Step S34).

Figure 18:
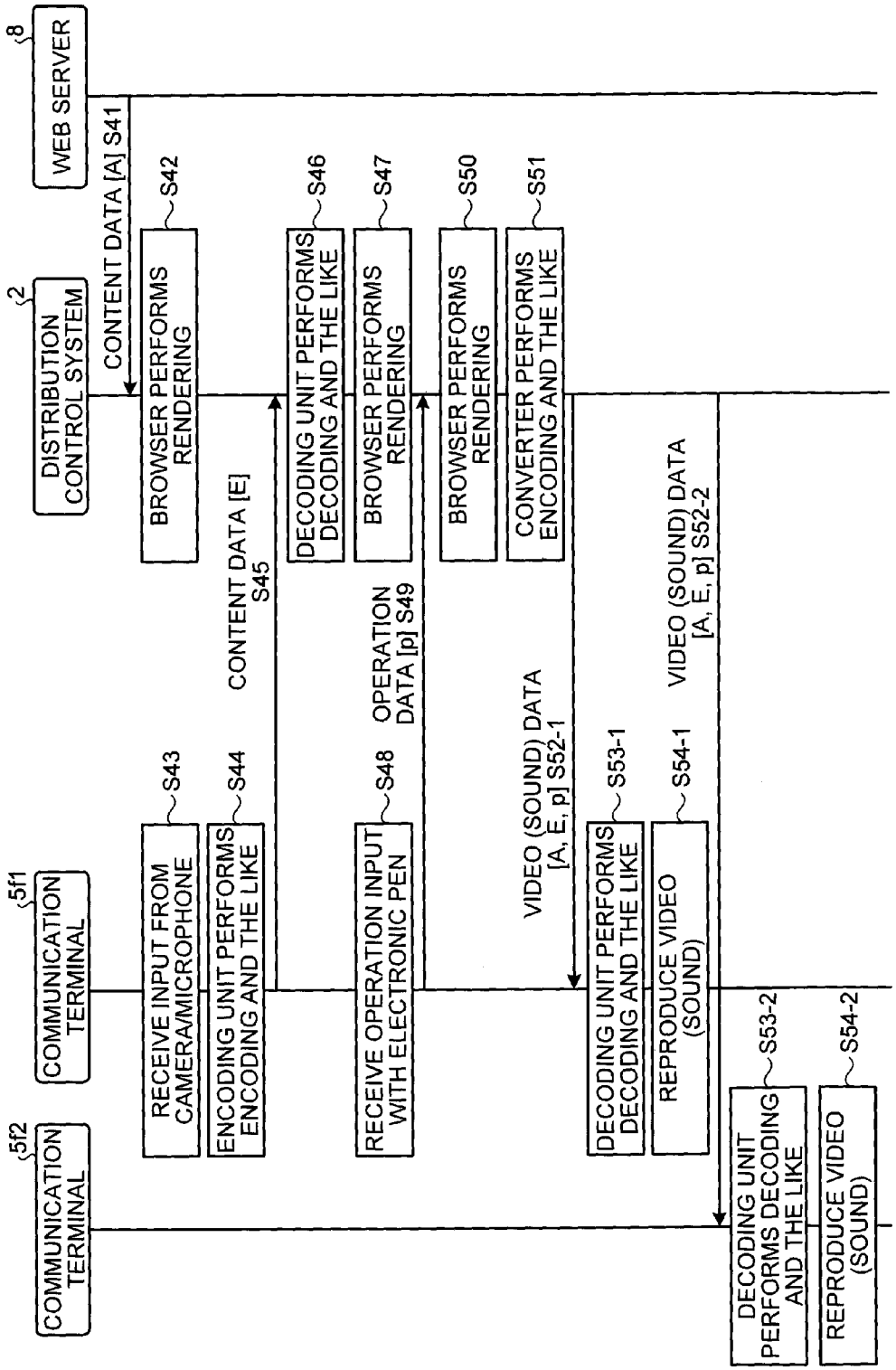
FIG. 18 is a sequence diagram illustrating communication processing using a plurality of communication terminals through the distribution control system.

Processing of Composite Distribution Using a Plurality of Communication Terminals The following describes communication processing using a plurality of communication terminals through the distribution control system with reference to FIG. 18. FIG. 18 is a sequence diagram illustrating distribution processing using a plurality of communication terminals through the distribution control system. Described here is specific processing for the communication terminals 5 in the pattern illustrated in FIG. 6. Because the processing here includes login processing, browser startup, and the like similar to Steps S21 to S29, description starts with the processing corresponding to Step S29.

As illustrated in FIG. 18, the transmitter/receiver 21 of the distribution control system 2 receives content data [A] from the web server 8 (Step S41). The browser 20 renders the content data [A], thereby generating pieces of frame data as still image (sound) data and outputs them to the transmission FIFO 24 (Step S42).

When the encoding unit 60 of the communication terminal 5/1 receives the input of content data as video (sound) data [E] from the camera 62 and the microphone 63 (Step S43), the encoding unit 60 encodes the content data [E] (Step S44). The transmitter/receiver 51 transmits the content data [E] encoded by the encoding unit 60 to the transmitter/receiver 31 of the distribution control system 2 (Step S45). The transmitter/receiver 31 of the distribution control system 2 receives the content data [E].

The decoding unit 40 of the distribution control system 2 decodes the content data [E] received by the transmitter/receiver 31 and outputs it to the reception FIFO 34 (Step S46). The browser 20 renders the content data [E] stored in the reception FIFO 34, thereby generating frame data [E] as still image (sound) data and outputs it to the transmission FIFO 24 (Step S47). In this case, the browser 20 outputs the data in a layout in which the content data [E] is combined with the content data [A] already acquired.

In addition, when the operating unit 52 of the communication terminal 5/1 receives the input of a stroke operation with the electronic pen P1 (Step S48), the transmitter/receiver 51 transmits operation data [p] indicating the details of the stroke operation received by the operating unit 52 to the transmitter/receiver 31 of the distribution control system 2 (Step S49). The transmitter/receiver 31 of the distribution control system 2 receives the operation data [p]. The browser management unit 22 outputs the operation data [p] received by the transmitter/receiver 31 to the browser 20.

The browser 20 renders the operation data [p], thereby generating frame data [p] as still image (sound) data and outputs it to the transmission FIFO 24 (Step S50). In this case, the browser 20 outputs the data in a layout in which the operation data [p] is combined with the content data ([A], [E]) already acquired.

The converter 10 encodes pieces of frame data ([A], [E], [p]) as still image (sound) data stored in the transmission FIFO 24, thereby converting them into video (sound) data ([A], [E], [p]) to be distributed to the communication terminals 5/1 and 5/2 (Step S51).

The transmitter/receiver 31 acquires the encoded video (sound) data ([A], [E], [p]) from the encoder bridge unit 30 including the converter 10 and transmits it to the transmitter/receiver 51 of the communication terminal 5/1 (Step S52-1). The transmitter/receiver 51 of the communication terminal 5/1 receives the video (sound) data ([A], [E], [p]), and the reproduction controller 53 of the communication terminal 5/1 acquires the video (sound) data ([A], [E], [p]) from the transmitter/receiver 51. In the communication terminal 5/1, the decoding unit 50 acquires the video (sound) data ([A], [E], [p]) from the reproduction controller 53 and decodes it (Step S53-1). After that, the speaker 61 reproduces sound based on decoded sound data ([A], [E]), and the display unit 58 reproduces video based on video data ([A], [E], [p]) acquired from the decoding unit 50 and rendered by the rendering unit 55 (Step S54-1).

For the communication terminal 5/2, as is the case with Step S52-1, the transmitter/receiver 31 acquires the encoded video (sound) data ([A], [E], [p]) from the encoder bridge unit 30 and transmits it to the transmitter/receiver 51 of the communication terminal 5/2 (Step S52-2). The reproduction controller 53 of the communication terminal 5/2 acquires the video (sound) data ([A], [E], [p]). In the communication terminal 5/1, the decoding unit 50 acquires the video (sound) data ([A], [E], [p]) from the reproduction controller 53 and decodes it (Step S53-2). After that, the speaker 61 reproduces sound based on decoded sound data ([A], [E]), and the display unit 58 reproduces video based on video data ([A], [E], [p]) acquired from the decoding unit 50 and rendered by the rendering unit 55 (Step S54-2).

Thus, the same video (sound) as the video (sound) output to the communication terminal 5/1 is output also to the communication terminal 5/2.

Processing of Time Adjustment

Figure 19:
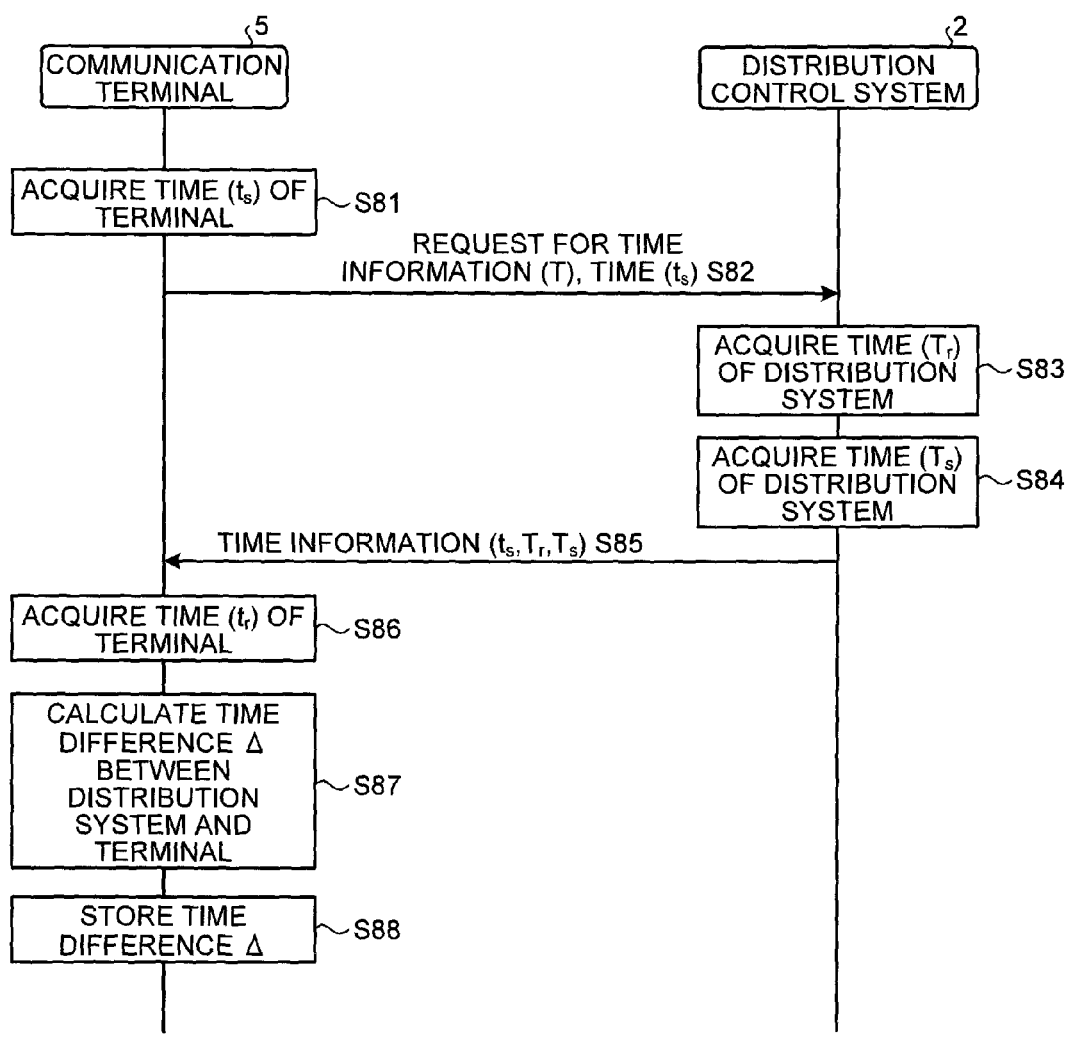
FIG. 19 is a sequence diagram illustrating the processing of time adjustment.

The processing of time adjustment is described with reference to FIG. 19. FIG. 19 is a sequence diagram illustrating the processing of time adjustment.

In order to acquire time indicating when the transmitter/receiver 51 issues a request for the time information (T) to the distribution control system 2, the time controller 56 of the communication terminal 5 acquires time information ($t_s$) in the communication terminal 5 from the storage unit 5000 (Step S81). The transmitter/receiver 51 issues a request for the time information (T) to the transmitter/receiver 31 (Step S82). In this case, the time information ($t_s$) is transmitted concurrently with the request for the time information (T).

In order to acquire time indicating when the transmitter/receiver 31 received the request at Step S82, the time acquisition unit 26 of the distribution control system 2 acquires time information ($T_r$) in the distribution control system 2 from the time management unit 25 (Step S83). In order to acquire time indicating when the transmitter/receiver 31 responds to the request at Step S82, the time acquisition unit 26 further acquires time information ($T_s$) in the distribution control system 2 from the time management unit 25 (Step S84). The transmitter/receiver 31 then transmits the time information ($t_s$, $T_r$, $T_s$) to the transmitter/receiver 51 (Step S85).

In order to acquire time indicating when the transmitter/receiver 51 received the response at Step S85, the time controller 56 of the communication terminal 5 acquires time information ($t_r$) in the communication terminal 5 from the storage unit 5000 (Step S86).

The time controller 56 of the communication terminal 5 calculates the time difference $\Delta$ between the distribution control system 2 and the communication terminal 5 (Step S87). This time difference $\Delta$ is given by Equation (1) below.

$$\Delta = ((T_r + T_s)/2) - ((t_r + t_s)/2) \qquad (1)$$

The time controller 56 stores the time difference information ($\Delta$) indicating the time difference $\Delta$ in the storage unit 5000 (Step S88). The series of processing of time adjustment is performed, for example, regularly every minute.

Processing of Downstream Channel Adaptive Control

Figure 20:
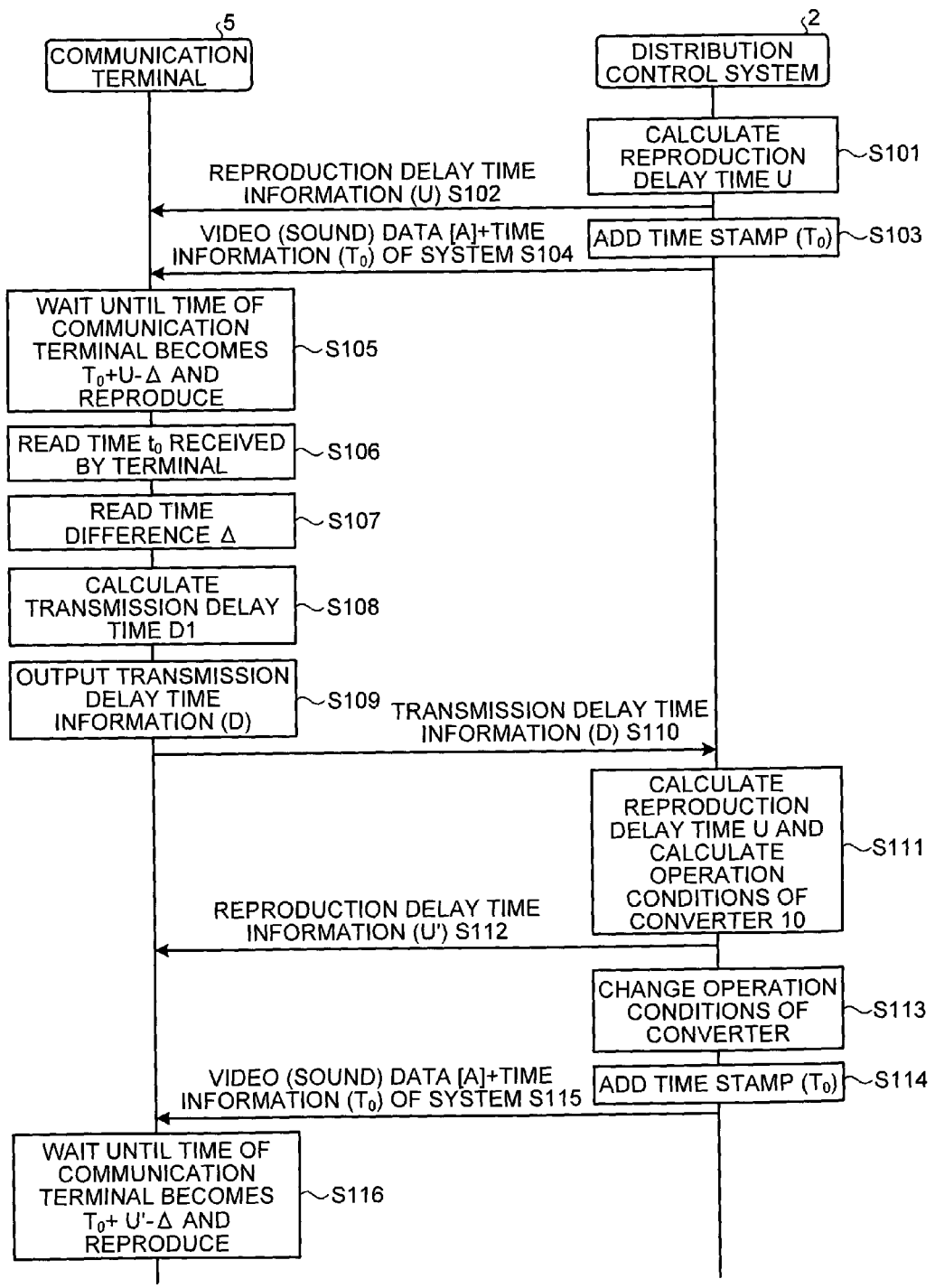
FIG. 20 is a sequence diagram illustrating the processing of channel adaptive control on data transmitted from the distribution control system to the communication terminal.

Described next with reference to FIG. 20 is the processing of channel adaptive control on data transmitted from the distribution control system 2 to the communication terminal 5 (downstream). FIG. 20 is a sequence diagram illustrating the processing of channel adaptive control on data transmitted from the distribution control system to the communication terminal.

First, the channel adaptive controller 27 of the distribution control system 2 calculates reproduction delay time information (U) indicating reproduction delay time U for delaying reproduction by buffering until the reproduction controller 53 of the communication terminal 5 reproduces video (sound) data, and outputs the reproduction delay time information (U) to the encoder bridge unit 30 (Step S101).

The transmitter/receiver 31 then acquires the reproduction delay time information (U) from the encoder bridge unit 30 and transmits it to the transmitter/receiver 51 of the communication terminal 5 (Step S102). The transmitter/receiver 51 of the communication terminal 5 receives the reproduction delay time information (U). The encoder bridge unit 30 adds time information ($T_0$) indicating time $T_0$ acquired from the time management unit 25, as a time stamp to the video (sound) data [A] acquired from the transmission FIFO 24 and encoded, for example (Step S103). The transmitter/receiver 31 transmits the video (sound) data and the time information ($T_0$) of the distribution control system 2 to the transmitter/receiver 51 of the communication terminal 5 (Step S104). The transmitter/receiver 51 of the communication terminal 5 receives the time information ($T_0$) of the distribution control system 2 and outputs the video (sound) data and the time information ($T_0$) to the reproduction controller 53.

In the communication terminal 5, based on the reproduction delay time information (U) acquired at Step S102, the time information ($T_0$) acquired at Step S104, and the time difference information ($\Delta$) stored in the storage unit 5000 at Step S88, the reproduction controller 53 waits until the time ($T_0+U-\Delta$) in the communication terminal 5 and then outputs the video (sound) data acquired at Step S104 to the decoding unit 50. This causes the speaker 61 to output sound and the display unit 58 to reproduce video through the rendering unit 55 (Step S105). This causes only video (sound) data received by the communication terminal 5 within the range of the reproduction delay time U given by Equation (2) below to be reproduced, while video (sound) data out of the range is delayed excessively and is deleted without being reproduced.

$$U \geq (t_0+\Delta)-T_0 \qquad (2)$$

The reproduction controller 53 reads the current time $t_0$ in the communication terminal 5 from the storage unit 5000 (Step S106). This time $t_0$ indicates time in the communication terminal 5 when the communication terminal 5 received video (sound) data from the distribution control system 2. The reproduction controller 53 further reads the time difference information ($\Delta$) indicating the time difference $\Delta$ stored at Step S86 in the storage unit 5000 (Step S107). The reproduction controller 53 then calculates the transmission delay time D1 indicating time from the point when the video (sound) data is transmitted from the distribution control system 2 to the point when it is received by the communication terminal 5 (Step S108). This calculation is performed with Equation (3) below; when the communication network 9 becomes congested, the transmission delay time D1 becomes longer.

$$D1=(t_0+\Delta)-T_0 \qquad (3)$$

The delay information acquisition unit 57 acquires transmission delay time information (D1) indicating the transmission delay time D1 from the reproduction controller 53 and holds it for a certain period of time, and when a plurality of pieces of transmission delay time information (D1) are acquired, outputs to the transmitter/receiver 51 the transmission delay time information (D) indicating frequency distribution information based on a plurality of pieces of transmission delay time D1 (Step S109). The transmitter/receiver 51 transmits the transmission delay time information (D) to the transmitter/receiver 31 of the distribution control system 2 (Step S110). The transmitter/receiver 31 of the distribution control system 2 receives the transmission delay time information (D) and outputs the transmission delay time information (D) to the channel adaptive controller 27.

The channel adaptive controller 27 of the distribution control system 2 newly calculates reproduction delay information U' based on the transmission delay time information (D) and calculates the operation conditions such as the frame rate and the data resolution of the converter 10 and outputs them to the encoder bridge unit 30 (Step S111). In other words, the channel adaptive controller 27 changes the operation of the encoder bridge unit 30 based on the transmission delay time information (D) and the size of the data (e.g., the number of bits or the number of bytes).

The transmitter/receiver 31 acquires reproduction delay time information (U') indicating the new reproduction delay time U' calculated at Step S111 from the encoder bridge unit 30 and transmits the reproduction delay time information (U') to the transmitter/receiver 51 of the communication terminal 5 (Step S112). The transmitter/receiver 51 of the communication terminal 5 receives the reproduction delay time information (U').

The converter 10 of the encoder bridge unit 30 changes the operation conditions of the converter 10 based on the channel adaptive control signal indicating the operation conditions (Step S113). For example, when the transmission delay time D1 is excessively long and the reproduction delay time U is made longer in accordance with the transmission delay time D1, reproduction time at the speaker 61 and the display unit 58 becomes delayed excessively. As a result, there is a limit to making the reproduction delay time U longer. In view of this, the channel adaptive controller 27 not only causes the encoder bridge unit 30 to change the reproduction delay time U to be the reproduction delay time U' but also causes the converter 10 to decrease the frame rate of video (sound) data and to decrease the resolution of video (sound) data, thereby addressing the congestion of the communication network 9. This causes the encoder bridge unit 30, as with Step S103, to add the current time information ($T_0$) to the video (sound) data [A] as a time stamp in accordance with the changed operation conditions (Step S104). The video (sound) data is thus added (Step S114). The transmitter/receiver 31 transmits the video (sound) data and the time information ($T_0$) of the distribution control system 2 to the transmitter/receiver 51 of the communication terminal 5 (Step S115). The transmitter/receiver 51 of the communication terminal 5 receives the video (sound) data and the time information ($T_0$) of the distribution control system 2 and outputs the video (sound) data and the time information ($T_0$) to the reproduction controller 53.

In the communication terminal 5, based on the reproduction delay time information (U') acquired at Step S112, the time information ($T_0$) acquired at Step S115, and the time difference information ($\Delta$) stored in the storage unit 5000 at Step S88, the reproduction controller 53 waits until the time ($T_0+U'-\Delta$) in the communication terminal 5 and then outputs the video (sound) data to the decoding unit 50, thereby, as with Step S105, causing the speaker 61 to output sound and the display unit 58 to reproduce video through the rendering unit 55 (Step S116). This is followed by the processing at and after Step S106. Thus, the processing of the downstream channel adaptive control is performed continuously.

Processing of Upstream Channel Adaptive Control

Figure 21:
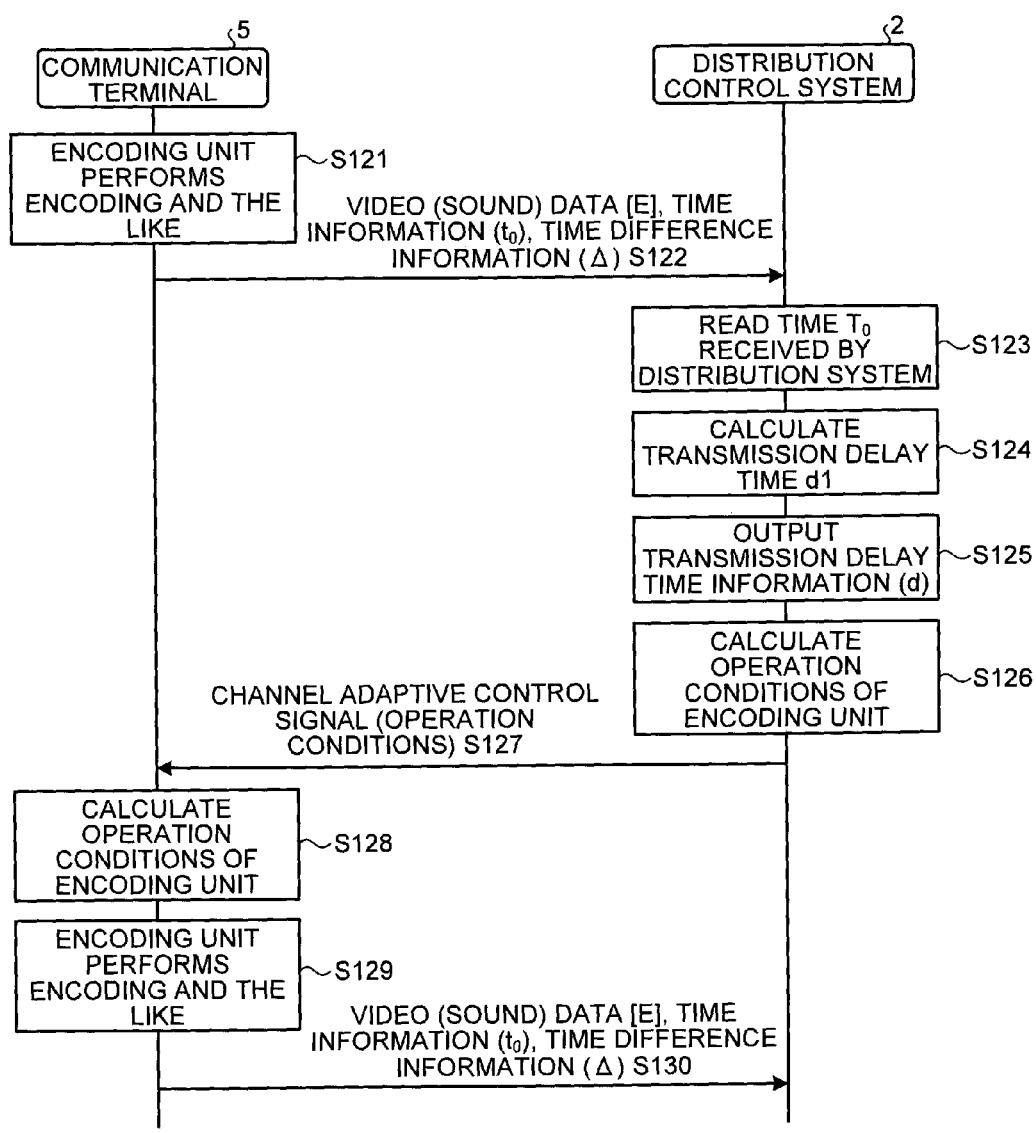
FIG. 21 is a sequence diagram illustrating the processing of channel adaptive control on data transmitted from the communication terminal to the distribution control system.

Described next with reference to FIG. 21 is the processing of channel adaptive control on data transmitted from the communication terminal 5 to the distribution control system 2 (upstream). FIG. 20 is a sequence diagram illustrating the processing of channel adaptive control on data transmitted from the communication terminal to the distribution control system.

First, the encoding unit 60 of the communication terminal 5 encodes content data as video (sound) data [E] input from the camera 62 and the microphone 63 (Step S121). In this situation, the encoding unit 60 acquires the time information ($t_0$) indicating the current time $t_0$ in the communication terminal 5 and the time difference information ($\Delta$) indicating the time difference $\Delta$ from the storage unit 5000 and does not encode them. The transmitter/receiver 51 transmits the video (sound) data [E], the time information ($t_0$), and the time difference information ($\Delta$) to the transmitter/receiver 31 of the distribution control system 2 (Step S122). The transmitter/receiver 31 of the distribution control system 2 receives the video (sound) data [E], the time information ($t_0$), and the time difference information ($\Delta$).

In the distribution control system 2, the decoding unit 40 reads time $T_0$ indicating when the video (sound) data [E] and the like were received at Step S112 from the time management unit 25 (Step S123). The decoding unit 40 then calculates transmission delay time d1 indicating time from the point when the video (sound) data is transmitted from the communication terminal 5 to the point when it is received by the distribution control system 2 (Step S124). This calculation is performed by Equation (4) below; when the communication network 9 becomes congested, the transmission delay time d1 becomes longer.

$$d1 = T_0 - (t_0 + \Delta) \quad (4)$$

As is the case with the delay information acquisition unit 57, the delay information acquisition unit 37a of the distribution control system 2 acquires transmission delay time information (d1) indicating the transmission delay time d1 from the decoding unit 40 and holds it for a certain period of time, and when a plurality of pieces of transmission delay time information (d1) are acquired, outputs to the channel adaptive controller 37b the transmission delay time information (d) indicating frequency distribution information based on a plurality of pieces of the transmission delay time d1 (Step S125).

Based on the transmission delay time information (d), the channel adaptive controller 37b calculates the operation conditions of the encoding unit 60 (Step S126). The transmitter/receiver 31 transmits a channel adaptive control signal indicating the operation conditions such as a frame rate and data resolution to the transmitter/receiver 51 of the communication terminal 5 (Step S127). The transmitter/receiver 51 of the communication terminal 5 receives the channel adaptive control signal. In other words, in the case of the channel adaptive control illustrated in FIG. 20 (downstream), the channel adaptive control signal is output to the encoder bridge unit 30 within the same distribution control system 2, and in contrast, in the case of the channel adaptive control illustrated in FIG. 21 (upstream), the channel adaptive control signal is transmitted to the communication terminal 5 from the distribution control system 2 through the communication network 9.

Based on the operation conditions received by the transmitter/receiver 51, the encoding unit 60 changes the operation conditions of the encoding unit 60 (Step S128). The encoding unit 60 then performs the same processing as Step S121 based on the new operation conditions (Step S129). The transmitter/receiver 51, as with Step S122, transmits the video (sound) data [E] acquired from the camera 62 and the microphone 63 and encoded, the time information ($t_0$) indicating the current time $t_0$ in the communication terminal 5 acquired from the storage unit 5000, and the time difference information ($\Delta$) indicating the time difference $\Delta$ also acquired from the storage unit 5000 to the transmitter/receiver 31 of the distribution control system 2 (Step S130). The transmitter/receiver 31 of the distribution control system 2 receives the video (sound) data [E], the time information ($t_0$), and the time difference information ($\Delta$). This is followed by the processing at and after Step S123. Thus, the processing of the upstream channel adaptive control is performed continuously.

Processing of Multidisplay

Figure 22:
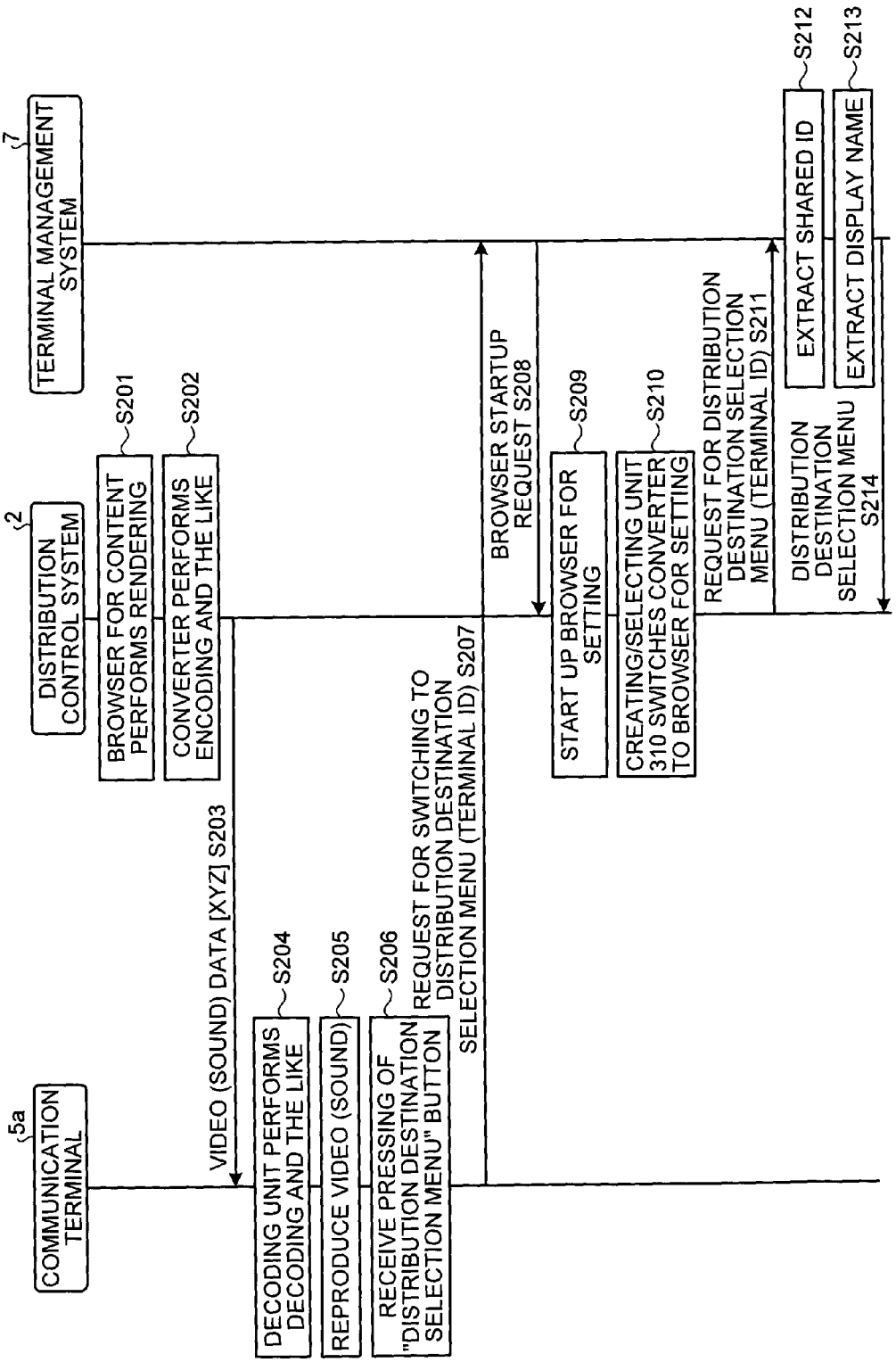
FIG. 22 is a sequence diagram illustrating the processing of multidisplay.
Figure 23:
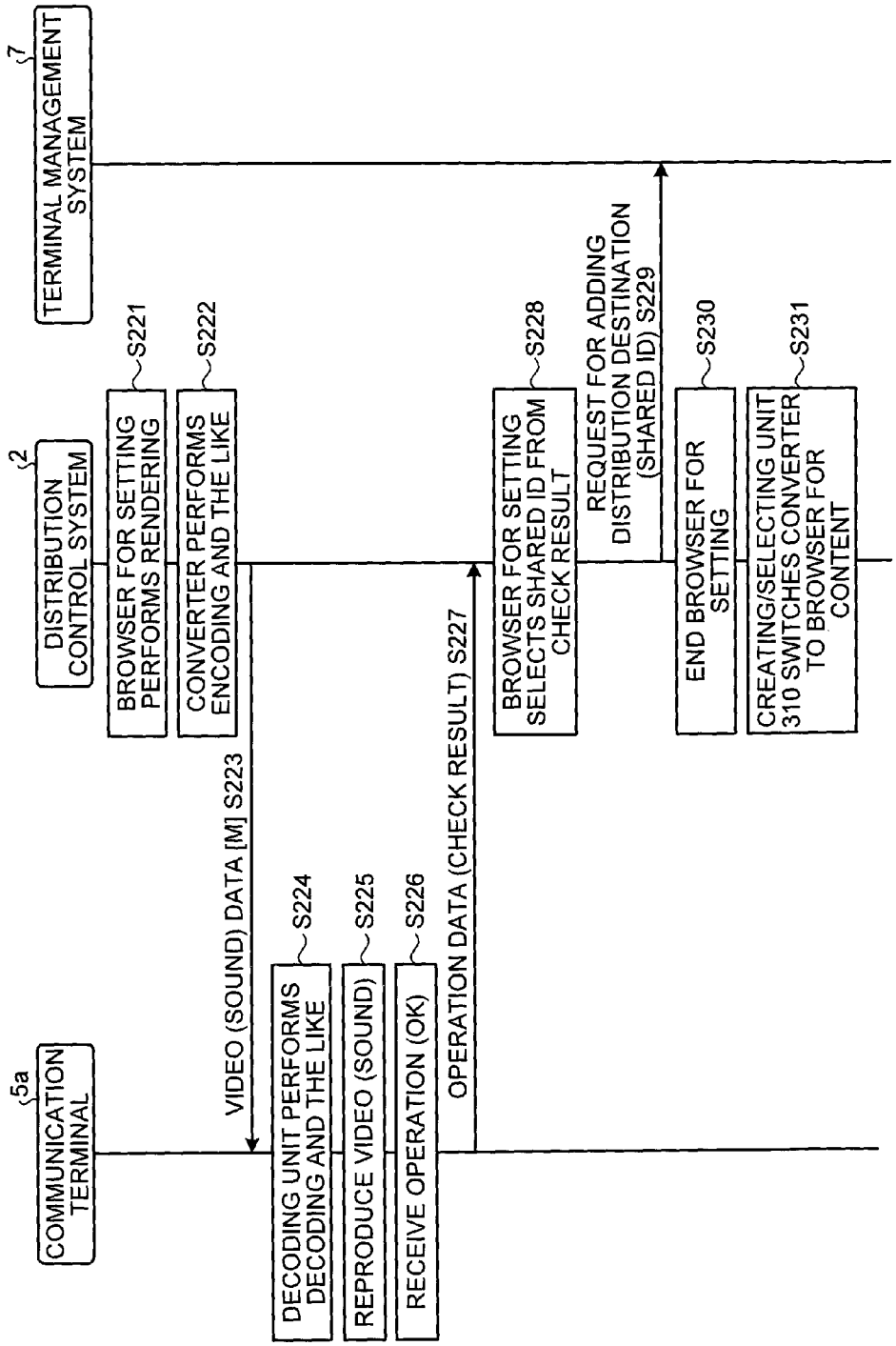
FIG. 23 is a sequence diagram illustrating the processing of multidisplay.
Figure 24:
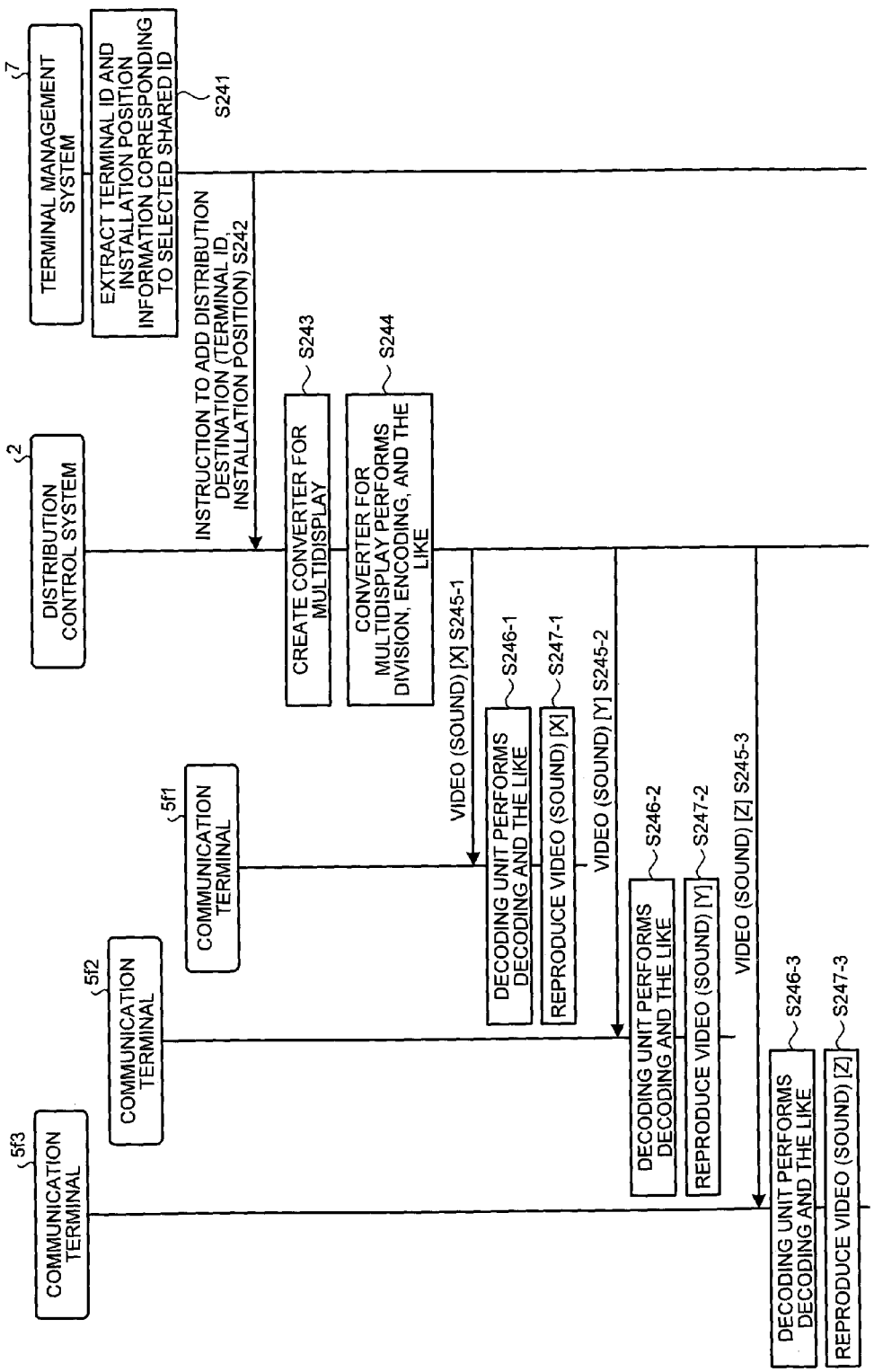
FIG. 24 is a sequence diagram illustrating the processing of multidisplay.

The processing of multidisplay is described next with reference to FIG. 22 to FIG. 24. FIG. 22 to FIG. 24 are sequence diagrams illustrating the processing of multidisplay illustrated in FIG. 5.

The following describes an example of reproducing video (sound) [XYZ] being reproduced on the communication terminal 5a also on the communication terminals (5f1, 5f2, 5f3) in a divided manner.

The browser 20 for displaying web content is referred to as a "browser 20a", and the browser 20 for displaying a setting screen for a user is referred to as a "browser 20b". Described first is the processing corresponding to Step S30 in FIG. 17.

First, the browser 20a of the distribution control system 2 renders the web content data [XYZ] acquired from the web server 8, thereby generating pieces of frame data as still image (sound) data and outputs them to the transmission FIFO 24 (Step S201). The converter 10 encodes the pieces of frame data stored in the transmission FIFO 24, thereby converting them into video (sound) data [XYZ] in a data format distributable to the communication terminal 5a (Step S202).

The transmitter/receiver 31 transmits the video (sound) data [XYZ] converted by the converter 10 to the transmitter/receiver 51 of the communication terminal 5a (Step S203). The transmitter/receiver 51 of the communication terminal 5a receives the video (sound) data [XYZ] and outputs it to the reproduction controller 53.

In the communication terminal 5a, the decoding unit 50 acquires the video (sound) data [XYZ] from the reproduction controller 53 and decodes it (Step S204). After that, the speaker 61 reproduces sound based on decoded sound data [XYZ], and the display unit 58 reproduces video based on video data [XYZ] acquired from the decoding unit 50 and rendered by the rendering unit 55 (Step S205).

A screen displayed on the display unit 58 is switched to a menu request screen (not illustrated) by the user of the communication terminal 5a, and the operating unit 52 receives the pressing of a "distribution destination selection menu" (not illustrated) on the menu request screen (Step S206). This causes the transmitter/receiver 51 to transmit a request for switching to the distribution destination selection menu to the transmitter/receiver 71a of the terminal management system 7 (Step S207). The transmitter/receiver 71a of the terminal management system 7 receives the request for switching to the distribution destination selection menu. This request includes the terminal ID of the communication terminal 5a.

The transmitter/receiver 71b transmits a startup request of the browser 20b to the transmitter/receiver 21 of the distribution control system 2 (Step S208). The transmitter/receiver 21 of the distribution control system 2 receives the startup request of the browser 20b and issues the startup request of the browser 20b to the browser management unit 22.

The browser management unit 22 then starts up the browser 20b (Step S209). The creating/selecting unit 310 of the encoder bridge unit 30 switches the output from the browser 20a to the converter 10 (e.g., the converter 10a) to the output from the browser 20*b* to the converter 10 (e.g., the converter 10*b*) (Step S210). When the communication terminal 5*a* and another communication terminal 5 (e.g., the communication terminal 5*b*) are sharing the converter 10 (e.g., the converter 10*a*) to receive the video (sound) data at Step S203, the creating/selecting unit 310 of the encoder bridge unit 30 newly creates the converter 10 (e.g., the converter 10*b*), because the other communication terminal 5 (e.g., the communication terminal 5*b*) is using the converter 10 (e.g., the converter 10*a*) for the browser 20*a*.

The transmitter/receiver 21 transmits a request for a distribution destination selection menu to the transmitter/receiver 71*b* of the terminal management system 7 in accordance with an instruction by the browser 20*b* (Step S211). In this situation, the terminal ID of the communication terminal 5*a* is also transmitted. The transmitter/receiver 71*b* of the terminal management system 7 receives the request for a distribution destination selection menu and outputs the terminal ID of the communication terminal 5*a* to the storage unit 7000.

In response thereto, the storage unit 7000 of the terminal management system 7 searches the available terminal management table 7020 based on the terminal ID, thereby extracting the corresponding shared ID (Step S212). This shared ID indicates a communication terminal 5 available for the communication terminal 5*a* to perform remote sharing processing. As illustrated in FIG. 14, because the terminal ID of the communication terminal 5*a* is "t001", the shared IDs to be extracted are "v003" and "v006".

The storage unit 7000 further searches the terminal management table 7010 based on the extracted shared ID, thereby extracting display name information indicating the corresponding display name (Step S213). As illustrated in FIG. 13, the display names corresponding to the extracted shared IDs "v003" and "v006" are "Tokyo head office 10F MFP" and "Osaka exhibition hall 1F multidisplay", respectively.

The transmitter/receiver 71*b* transmits distribution destination selection menu data [M] as content data to the transmitter/receiver 21 of the distribution control system 2 (Step S214). The transmitter/receiver 21 of the distribution control system 2 receives the distribution destination selection menu data [M] and outputs it to the browser 20*b*. As illustrated in FIG. 12, this distribution destination selection menu data [M] includes check boxes, shared IDs, and display names.

As illustrated in FIG. 23, the browser 20*b* renders the content data indicating the distribution destination selection menu data [M] acquired from the terminal management system 7, thereby generating pieces of frame data as still image (sound) data and outputs them to the transmission FIFO 24 (Step S221). The converter 10 encodes the pieces of image (sound) data [M] stored in the transmission FIFO 24, thereby converting them into video (sound) data [M] in a data format distributable to the communication terminal 5*a* (Step S222).

The transmitter/receiver 31 transmits the video (sound) data [M] converted by the converter 10 to the transmitter/receiver 51 of the communication terminal 5*a* (Step S223). The transmitter/receiver 51 of the communication terminal 5*a* receives the video (sound) data [M] and outputs it to the reproduction controller 53.

In the communication terminal 5*a*, the decoding unit 50 acquires the video (sound) data [M] from the reproduction controller 53 and decodes it (Step S224). After that, the display unit 58 reproduces video as illustrated in FIG. 12 based on the video data [XYZ] acquired from the decoding unit 50 and rendered by the rendering unit. 55 (Step S225).

In the distribution destination selection menu illustrated in FIG. 12, when the check box of the shared ID "v006" is checked and the "OK" button is pressed by the user, the operating unit 52 receives the operation input by the user (Step S226).

The transmitter/receiver 51 transmits a check result as operation data to the transmitter/receiver 31 of the distribution control system 2 (Step S227). The transmitter/receiver 31 of the distribution control system 2 receives the check result as operation data and outputs it to the browser 20*b*.

The browser 20*b* selects the shared ID from the check result (Step S228). The transmitter/receiver 21 transmits a request for adding a distribution destination, to the transmitter/receiver 71*b* of the terminal management system 7 in accordance with an instruction by the browser 20*b* (Step S229). This request for adding a distribution destination includes the shared ID selected at Step S227. The transmitter/receiver 71*b* of the terminal management system 7 receives the request for adding a distribution destination and outputs the shared ID to the storage unit 7000. The browser 20*b* then ends (Step S230). This causes the creating/selecting unit 310 of the encoder bridge unit 30 to switch the output from the browser 20*b* to the converter 10 back to the output from the browser 20*a* to the converter 10 (Step S231).

As illustrated in FIG. 24, in the storage unit 7000 of the terminal management system 7, the terminal management table 7010 is searched based on the shared ID sent at Step S229, thereby extracting the corresponding terminal ID and installation position information (Step S241). The transmitter/receiver 71*b* transmits an instruction to add a distribution destination, to the transmitter/receiver 21 of the distribution control system 2 (Step S242). This instruction to add a distribution destination includes the terminal ID and the installation position information extracted at Step S241. The transmitter/receiver 21 of the distribution control system 2 receives the instruction to add a distribution destination and outputs the instruction to add a distribution destination to the browser management unit 22. Included here are three sets of the terminal ID and the installation position information, that is, the terminal ID and the installation position information being "t006" and "left", respectively, the terminal ID and the installation position information being "t007" and "middle", respectively, and the terminal ID and the installation position information being "t008" and "right", respectively.

The creating/selecting unit 310 of the encoder bridge unit 30 creates a converter 10 for multidisplay (Step S243). In this case, the creating/selecting unit 310 of the encoder bridge unit 30 acquires the terminal ID and the installation position information from the browser management unit 22.

The dividing unit 13 of the converter 10 created at Step S243 divides the pieces of frame data [XYZ] as still image (sound) data stored in the transmission FIFO 24, and the encoding unit 19 encodes the divided pieces of frame data (Step S244).

The transmitter/receiver 31 transmits video (sound) data [X] encoded by the encoder bridge unit 30 to the transmitter/receiver 51 of the communication terminal 5/1 based on the terminal ID ("t006") and the installation position information ("left") (Step S245-1). The transmitter/receiver 51 of the communication terminal 5/1 receives the video (sound) data [X] and outputs it to the reproduction controller 53.

In the communication terminal 5/1, the decoding unit 50 acquires the video (sound) data [X] from the reproduction controller 53 and decodes it (Step S246-1) After that, the speaker 61 reproduces sound based on decoded sound data [X], and the display unit 58 reproduces video based on video data [X] acquired from the decoding unit 50 and rendered by the rendering unit 55 (Step S247-1).

Similarly, the transmitter/receiver 31 transmits video (sound) data [Y] encoded by the encoder bridge unit 30 to the transmitter/receiver 51 of the communication terminal 5/2 based on the terminal ID ("t007") and the installation position information ("middle") (Step S245-2). The transmitter/receiver 51 of the communication terminal 5/2 receives the video (sound) data [Y] and outputs it to the reproduction controller 53.

In the communication terminal 5/2, the decoding unit 50 acquires the video (sound) data [Y] from the reproduction controller 53 and decodes it (Step S246-2). After that, the speaker 61 reproduces sound based on decoded sound data [Y], and the display unit 58 reproduces video based on video data [Y] acquired from the decoding unit 50 and rendered by the rendering unit 55 (Step S247-2).

Similarly, the transmitter/receiver 31 transmits video (sound) data [Z] encoded by the encoder bridge unit 30 to the transmitter/receiver 51 of the communication terminal 5/3 based on the terminal ID ("t008") and the installation position information ("right") (Step S235-3). The transmitter/receiver 51 of the communication terminal 5/3 receives the video (sound) data [Z] and outputs it to the reproduction controller 53.

In the communication terminal 5/3, the decoding unit 50 acquires the video (sound) data [Z] from the reproduction controller 53 and decodes it (Step S246-3). After that, the speaker 61 reproduces sound based on decoded sound data [Z], and the display unit 58 reproduces video based on video data [Z] acquired from the decoding unit 50 and rendered by the rendering unit 55 (Step S247-3).

Processing of Gesture Conversion

Figure 25:
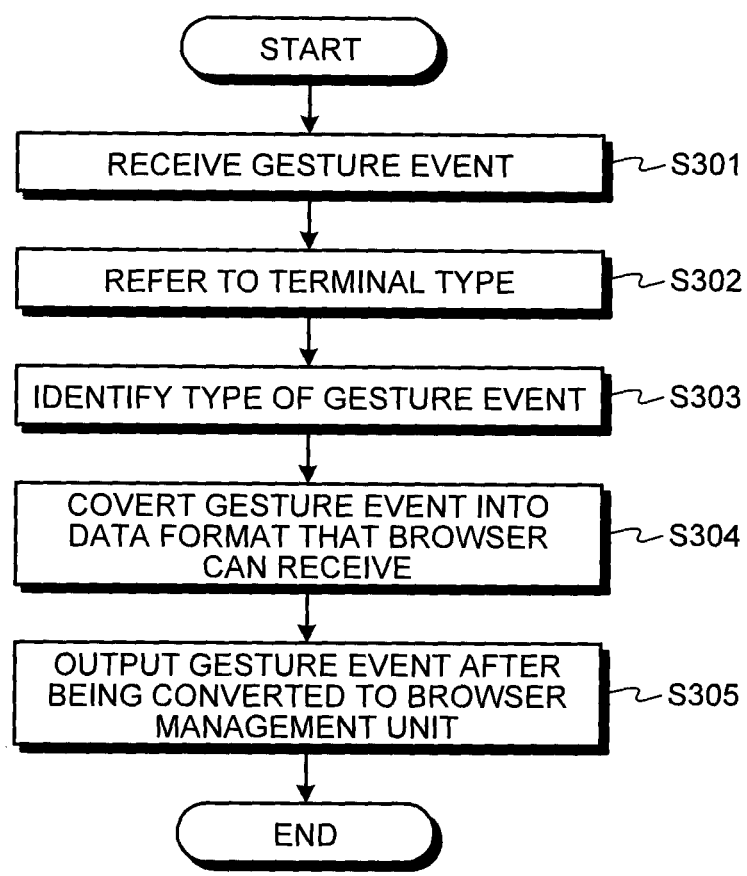
FIG. 25 is a flowchart illustrating the processing of gesture conversion.

Described next with reference to FIG. 25 is the processing of the above gesture conversion. FIG. 25 is a flowchart illustrating the processing of the gesture conversion. The transmitter/receiver 31 of the distribution control system 2 receives a gesture event from the transmitter/receiver 51 of the communication terminal 5 (Step S301).

The transmitter/receiver 31 refers to a terminal type contained in the gesture event (Step S302). The terminal type corresponds to the terminal type listed in the terminal management table (refer to FIG. 13). In other words, the terminal type is information for identifying the type of the communication terminal 5. The transmitter/receiver 31 identifies the type of the communication terminal 5 through the terminal type, thereby identifying the type of the gesture event.

The terminal type indicates information on the hardware of the communication terminal 5, the OS of the communication terminal 5, and the language of an input device of the communication terminal 5, for example. Examples of the hardware of the communication terminal 5 include a notebook PC, a tablet terminal, an MFP, a projector, a camera, a speaker, and an electronic blackboard. The OS of the communication terminal 5 is an OS operating on the communication terminal 5. In general, when OSs are different, even with the same hardware of the communication terminal 5, gesture events indicating the same operation input are different from each other. The language of the input device of the communication terminal 5 is, when the input device is a keyboard, for example, information for identifying keyboard arrangement of the communication terminal 5 appropriate for the language.

The transmitter/receiver 31 identifies the type of the gesture event of the communication terminal 5 from the terminal type (Step S303).

The following describes examples of the gesture event. As for the communication terminal 5a (notebook personal computer), the gesture event indicates an operation input with a keyboard, a mouse, or the like. As for the communication terminal 5b (smartphone, tablet terminal, or the like), the gesture event is an operation input through screen operations such as pinching (zooming in and out), touching, scrolling, and swiping. As for the communication terminal 5d (projector), the gesture event is information indicating the coordinates of a position indicated by a user on a projected plane, for example. The communication terminal 5d (projector) detects the coordinates using, for example, a camera that photographs the projected plane. As for the communication terminal 5f (electronic blackboard), the gesture event indicates an operation input with an electronic pen or the like.

The transmitter/receiver 31 converts the data format of the gesture event in accordance with the type of the gesture event and converts the gesture event into a data format that the browser 20 can receive (Step S304). The transmitter/receiver 31 then outputs the gesture event after being converted to the browser management unit 22 (Step S305).

The distribution control system 2 performs the processing of the gesture conversion in this manner, whereby the communication terminal 5 only needs to transmit the gesture event to the distribution control system 2 regardless of what data format its own gesture event is. This can reduce a processing load on the communication terminal 5.

Main Effects of the Embodiment

As described above with reference to the specific example, in the distribution system 1 according to the present embodiment, the distribution control system 2 includes the browser 20 that performs rendering and the encoder bridge unit 30 that performs encoding and the like in the cloud. The browser 20 generates pieces of frame data as still image (sound) data based on content data described in a certain description language. The encoder bridge unit 30 converts the pieces of frame data into video (sound) data distributable through the communication network 9. After that, the distribution control system 2 distributes the video (sound) data to the communication terminal 5. As a result, the communication terminal 5 can smoothly reproduce web content without update of its browser or time and costs for upgrading the specifications of a CPU, an OS, a RAM, and the like. This eliminates the problem in that enriched content increases a load on the communication terminal 5.

In particular, the browser 20 enables real-time communication, and the converter 10 performs real-time encoding on the frame data generated by the browser 20. Consequently, unlike a case in which a DVD player selects and distributes non real-time (that is, pre-encoded) video (sound) data as seen in, for example, on-demand distribution of video (sound) data, the distribution control system 2 renders content acquired immediately before being distributed, thereby generating pieces of frame data and then encoding them. This allows real-time distribution of video (sound) data.

Supplementary Description

The distribution system 1 according to the present embodiment includes the terminal management system 7 and the distribution control system 2 as separate systems. For example, the terminal management system 7 and the distribution control system 2 may be constructed as an integral system by, for example, causing the distribution control system 2 to have the functions of the terminal management system 7.

The distribution control system 2 and the terminal management system 7 according to the above embodiment may be implemented by a single computer or may be implemented by a plurality of computers in which individual parts (functions, means, or storage units) are divided and assigned in any desirable unit.

Storage media such as CD-ROMs and HDDs in which the programs of the above embodiment are recorded can be provided as program products domestically or abroad.

One aspect of the present invention can generate still image data from content data, convert the still image data into video data, and transmit the video data to a communication terminal. This reduces a load on the communication terminal for receiving the content data and a load on the communication terminal for generating the still image data from the content data after reception, thereby resolving a problem in that a high load is imposed on the communication terminal to respond to the enrichment of content.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. A distribution control system for distributing data through a communication network, the distribution control system being communicable with a cloud web server and comprising:
    processing circuitry to
        receive, from a web server, first content data, wherein the first content data includes at least one of image and sound data in Hypertext Markup Language (HTML), image and sound data in Cascading Style Sheets (CSS), image and sound data in MP4 (MPEG-4), and sound data in Advanced Audio Coding (AAC);
        generate first frame data by rendering the received first content data;
        receive, from a first communication terminal, second content data obtained from a camera of the first communication terminal;
        generate second frame data by rendering the received second content data;
        receive, from the first communication terminal, third content data indicating strokes drawn with an electronic pen;
        generate third frame data by rendering the received third content data;
        combine the first, second, and third frame data to generate combined frame data; and
        convert, using a first converter, the combined frame data into transmission data to be transmitted through the communication network by encoding the combined frame data,
    wherein the processing circuitry is further to create a second converter that enables conversion according to a capability of the second communication terminal to reproduce the transmission data, and use the first converter for the first communication terminal without creating the second converter for the second communication terminal, in starting distribution to the second communication terminal in addition to distribution to the first communication terminal by the distribution control system, when (1) the distribution control system distributes a same transmission data as the transmission data being distributed to the first communication terminal to the second communication terminal, and (2) the second communication terminal has a same capability as a capability of the first communication terminal to reproduce the transmission data,
    wherein the capability of the first communication terminal is to reproduce the transmission data at least with a display resolution of the first communication terminal, and
    wherein the distribution control system further includes a transmitter to transmit the transmission data to each of the first and second communication terminals.

2. The distribution control system according to claim 1, wherein the processing circuitry is further to acquire the first content data described in a certain description language and generate the first frame data.

3. The distribution control system according to claim 1, wherein the processing circuitry is further to create a number of converters according to a number of pieces of the first content data.

4. The distribution control system according to claim 1, wherein the processing circuitry is further to generate a single piece of frame data obtained by combining a plurality of pieces of the first content data.

5. The distribution control system according to claim 1, wherein
    the processing circuitry is further to operate as a web browser, and
    the first converter includes an encoder configured to encode the first frame data generated by the web browser.

6. The distribution control system according to claim 5, wherein
    the processing circuitry is further to operate as a web browser that enables real-time communication, and
    the first converter is to perform real-time encoding on the first frame data generated by the web browser.

7. The distribution control system according to claim 6, wherein the first converter is to perform trimming or resizing and then encoding on the first frame data generated by the processing circuitry.

8. The distribution control system according to claim 7, wherein the first converter is to perform trimming, resizing, dividing, and then encoding.

9. A distribution system, comprising:
    the distribution control system according to claim 1; and
    the first communication terminal.

10. The distribution system according to claim 9, wherein
    the first communication terminal includes an interface to receive operation input by a user and output operation data, and
    the processing circuitry is further to generate the third frame data including the operation data output from the interface and combine the third frame data with the first and second frame data to generate the combined frame data.

11. The distribution system of claim 9, wherein the first communication terminal includes a processor to decode and reproduce the transmission data, which includes the second content data obtained from the camera of the first communication terminal.

12. A method for distributing data in a distribution control system that is communicable with a cloud webserver through a communication network, the method comprising:

receiving, from a web server, first content data, wherein the first content data includes at least one of image and sound data in Hypertext Markup Language (HTML), image and sound data in Cascading Style Sheets (CSS), image and sound data in MP4 (MPEG-4), and sound data in Advanced Audio Coding (AAC);

generating first frame data by rendering the received first content data;

receiving, from a first communication terminal, second content data obtained from a camera of the first communication terminal;

generating second frame data by rendering the received second content data;

receiving, from the first communication terminal, third content data indicating strokes drawn with an electronic pen;

generating third frame data by rendering the received third content data;

combining the first, second, and third frame data to generate combined frame data; and converting, using a first converter, the combined frame data into transmission data to be transmitted through the communication network by encoding the combined frame data;

wherein the method further includes creating a second converter that enables conversion according to a capability of a second communication terminal to reproduce the transmission data, and using the first converter for the first communication terminal without creating the second converter for the second communication terminal, in starting distribution to the second communication terminal in addition to distribution to the first communication terminal by the distribution control system, when (1) the distribution control system distributes a same transmission data as transmission data being distributed to the first communication terminal to the second communication terminal, and (2) the second communication terminal has a same capability as a capability of the first communication terminal to reproduce the transmission data, wherein the capability of the first communication terminal is to reproduce the transmission data at least with a display resolution of the first communication terminal, and wherein the method further includes transmitting the transmission data to each of the first and second communication terminals.

* * * * *